(12) United States Patent
Paranjape et al.

(10) Patent No.: US 12,265,428 B2
(45) Date of Patent: Apr. 1, 2025

(54) DEVICE POSTURE-BASED PRE-BOOT DISPLAY ORIENTATION AND OTHER USAGE SUPPORT

(71) Applicant: Intel Corporation, Santa Clara, CA (US)

(72) Inventors: Vivek Paranjape, Portland, OR (US); Royce Fernald, Portland, OR (US); Arvind Singh Tomar, Folsom, CA (US); James M. Yoder, Beaverton, OR (US); Jun Jiang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 17/358,668

(22) Filed: Jun. 25, 2021

(65) Prior Publication Data

US 2021/0318727 A1 Oct. 14, 2021

(51) Int. Cl.
*G06F 9/00* (2018.01)
*G06F 1/16* (2006.01)
(Continued)

(52) U.S. Cl.
CPC .......... *G06F 1/1677* (2013.01); *G06F 1/1681* (2013.01); *G06F 3/147* (2013.01); *G06F 9/4403* (2013.01); *G06F 9/4401* (2013.01)

(58) Field of Classification Search
CPC ...... G06F 1/1677; G06F 1/1681; G06F 3/147; G06F 9/4403; G06F 1/1641;
(Continued)

(56) References Cited

U.S. PATENT DOCUMENTS

| 11,301,261 B2* | 4/2022 | Bhuiyan | G06F 9/4408 |
| 2012/0054478 A1* | 3/2012 | Curtis | G09G 3/20 |
| | | | 345/659 |

(Continued)

OTHER PUBLICATIONS

Britta O'Boyle, "Best folding phones 2021: Top foldables that are available right now," Pocket-lint.com, May 1, 2021, retrieved on Jun. 25, 2021 from https://www.pocket-lint.com/phones/news/146826-best-foldable-smartphones, 17 pages.
Chris Hoffman, "How to Rotate Your PC's Screen (or Fix a Sideways Screen)," How-To Geek, Jun. 25, 2018, retrieved on Jun. 25, 2021 from https://www.howtogeek.com/356816/how-to-rotate-your-pcs-screen-or-fix-a-sideways-screen/, 9 pages.
(Continued)

*Primary Examiner* — Volvick Derose
(74) *Attorney, Agent, or Firm* — Alliance IP, LLC

(57) ABSTRACT

An example computing device comprises a processor to be coupled to a display device, and a boot controller coupled to the processor and to be coupled to the display device. The boot controller is configured to detect a power signal, receive sensor data detected by one or more sensors prior to an operating system being loaded by a boot process of the processor, determine a posture associated with the display device based on the sensor data detected by the one or more sensors, and communicate, to the display device, posture information indicating the posture associated with the display device. Pre-boot content is to be displayed on a display panel of the display device in a first arrangement based on the posture information. In more specific embodiments, determining the posture includes determining at least an orientation of the display device and whether a peripheral is present on the display device.

25 Claims, 12 Drawing Sheets

(51) Int. Cl.
 *G06F 3/147* (2006.01)
 *G06F 9/4401* (2018.01)
(58) Field of Classification Search
 CPC .... G06F 1/1652; G06F 1/1694; G06F 3/0481; G06F 3/04886; G06F 3/1423; G06F 2200/1614; G06F 2203/04803; G06F 9/4401; G06F 3/0487; G09G 2330/026; G09G 2356/00; G01D 7/00
 USPC .......................................................... 713/2
 See application file for complete search history.

(56) References Cited

U.S. PATENT DOCUMENTS

| | | | |
|---|---|---|---|
| 2016/0259650 A1* | 9/2016 | Lewis | G06F 9/4411 |
| 2020/0159293 A1* | 5/2020 | Seibert | G06F 1/1643 |
| 2020/0159336 A1* | 5/2020 | Torres | G06F 3/03545 |
| 2020/0380935 A1* | 12/2020 | Ignaszewski | G06F 1/1622 |
| 2021/0096606 A1* | 4/2021 | Hamlin | G06F 1/1616 |
| 2024/0036880 A1* | 2/2024 | Nishio | G06F 1/1616 |

OTHER PUBLICATIONS

Microsoft Docs, "User Experience for UEFI firmware updates" and "Boot screen components," Jun. 16, 2021, retrieved on Jun. 25, 2021 from https://opdhsblobprod04.blob.core.windows.net/contents/e8076ea2fc0149e5a2cb281b153d2b9c/8e54f06eeebd754c528e34c25af4fb92?sv=2018-03-28&sr=b&si=ReadPolicy&sig=REz8pJi0TGydLUNDW%2BkzmWBY1kqJFahJpUoKrNz9uVM%3D&st=2021-06-25T21%3A41%3A41Z&se=2021-06-26T21%3A51%3A41Z, 319 pages.
Protectli.com, "How to customize the boot splash screen," Protectli.com, Oct. 2, 2020, retrieved on Jun. 25, 2021 from https://protectli.com/kb/how-to-customize-the-boot-splash-screen/, 6 pages.
Steven John, "How to rotate your iPad screen and lock or unlock its orientation," BusinessInsider.com, Feb. 13, 2019, retrieved from https://www.businessinsider.com/how-to-rotate-ipad-screen-lock-unlock-orientation, 7 pages.
Wikipedia, "Bootsplash," Mar. 21, 2021, retrieved on Jun. 25, 2021 from https://en.wikipedia.org/wiki/Bootsplash, 3 pages.
EPO European Extended Search Report in EP Application Serial No. 22163662.4 mailed on Sep. 6, 2022, 10 pages.

* cited by examiner

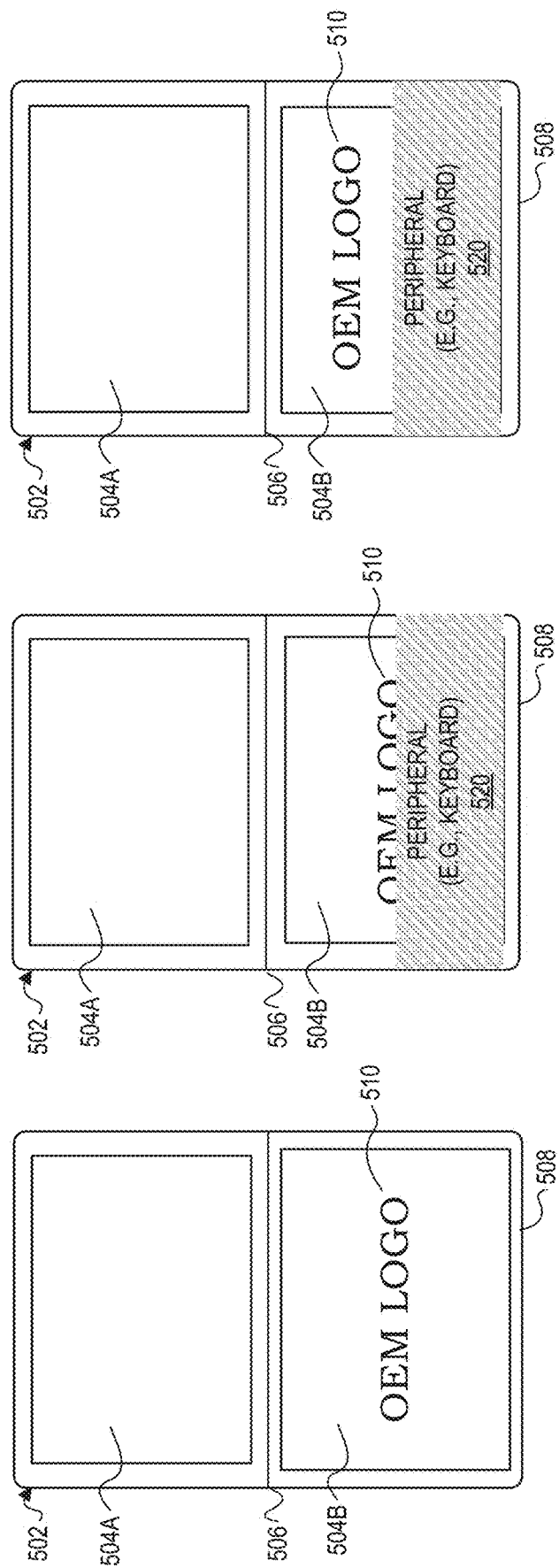

DEVICE POSTURE-BASED PRE-BOOT DISPLAY ORIENTATION AND OTHER USAGE SUPPORT

TECHNICAL FIELD

This disclosure relates in general to computing devices, and more particularly, to device posture-based pre-boot display orientation and other usage support.

BACKGROUND

As technology has become an integral part of daily life, form factors for computing devices are continuously evolving. New form factors such as foldable systems and dual display systems are designed to be used in multiple different orientations or postures. For example, a foldable system can be used in a laptop posture, a tablet posture, a tabletop (e.g., all-in-one) posture, or a journal (e.g., book) posture. Dual display systems may incorporate an external accessory or hardware peripheral such as a keyboard that covers a portion of one display panel. Content that is displayed in a display panel of a computing device prior to loading an operating system during a boot process may be displayed in an orientation that is not aligned with the posture of the computing device or in an area of the display panel where the displayed content is not consumable by a user.

BRIEF DESCRIPTION OF THE DRAWINGS

FIGS. 5A-5B are block diagrams illustrating an example default signs of life display orientation in yet another example computing device in various postures.

FIG. 5C is a block diagram illustrating a signs of life display orientation in the example computing device of FIGS. 5A-5B, according to an embodiment.

Like reference numbers and designations in the various drawings indicate like elements.

DETAILED DESCRIPTION

Figure 1A:
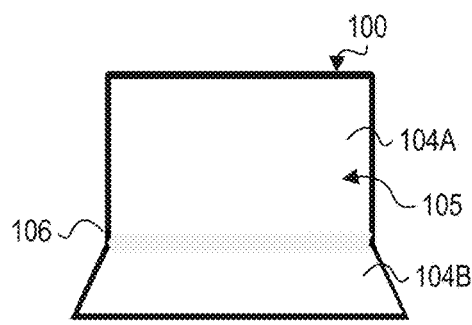
FIGS. 1A-1E are pictorial diagrams of some possible postures of a foldable computing device.

The present disclosure provides various possible embodiments, or examples, of systems, methods, machine readable media, and apparatuses to enable device posture-based pre-boot display orientation and other usage support in computing devices. Many of today's computing device form factors are operable in various postures. For example, at least some mobile devices, foldable computing devices, tablets, and/or all-in-one devices allow users to operate the devices in various postures. Different postures of a particular device may correspond to different orientations of a display device, the presence/absence of a hardware peripheral on a display panel, and/or various combinations thereof. Typically, an operating system of such a device can manage the orientation of content displayed on a display panel in order to ensure that the content is correctly oriented to be readable by a user of the device. Pre-boot content, however, is not managed by the operating system and may not be displayed in an arrangement in a display panel that is consumable (e.g., visible and correctly oriented to be readable) by the user. In this disclosure, an arrangement of content in a display panel is considered to be not consumable by the user if the content is not aligned with device posture (e.g., when the content is displayed sideways or upside down to the user) and/or if the content is not visible to the user (e.g., when content is displayed in an area of a display panel that is hidden by a peripheral such as a keyboard).

Various embodiments disclosed herein enable an improved, seamless user experience by displaying all pre-boot content or content in accordance with the user's intended device use posture. Thus, a user does not have to change device posture during the pre-boot stage and reorient the device again post-boot to its intended use posture in order to consume or interact with content displayed on the device. It should also be noted that, as used herein, the term 'content' can include text, images, videos, user input boxes, graphical display elements, graphical interaction elements (e.g. scroll bars, buttons, etc.), data, or information that is displayable on a display device, or any combination thereof.

To better understand the techniques of the various embodiments in this disclosure, the following contextual information related to various computing device postures, the pre-boot environment, and displaying content on display panels of display devices is now provided. Form factors of computing devices are continuously evolving to provide new operational features and display options for users. In particular, many computing device form factors are designed to be operable in different postures. The term 'posture', as used in reference to a computing device herein, is intended to mean either the rotation or orientation of a display device of the computing device relative to a user of the computing device and/or the presence or absence of a hardware peripheral (e.g., hardware keyboard) or other external accessory.

Figure 1B:
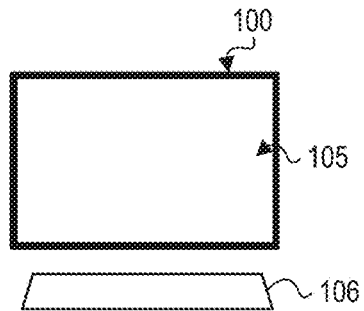
Figure 1C:
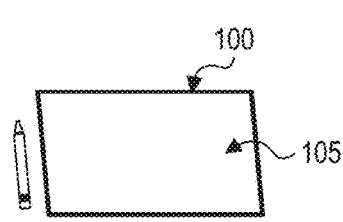
Figure 1D:
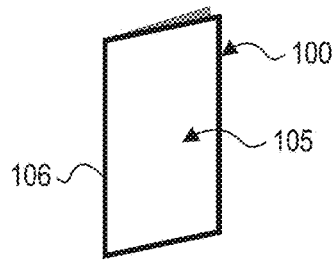
Figure 1E:
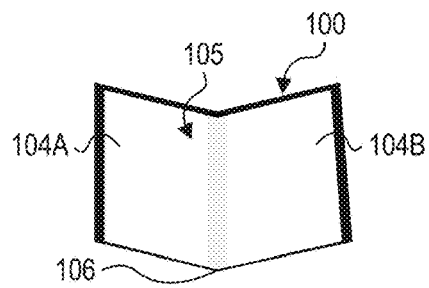

FIGS. 1A-1E show pictorial diagrams of some possible postures of a foldable computing device 100. FIG. 1A shows foldable computing device 100 in a laptop posture, including a display panel 105 having a first portion 104A and a second portion 104B, both of which are arranged in a landscape orientation to display content to a user. The first and second portions 104A and 104B may include housing members to contain electronic components of the computing device. Additionally, the first portion 104A may be rotatably connected to the second portion 104B by, for example, a hinge 106 connected to the housing members. The hinge may be configured to permit movement of the portions relative to one another about an axis. FIG. 1B shows foldable computing device 100 including a peripheral keyboard 106, where the foldable computing device 100 is in a tabletop posture where the display panel 105 is generally flat and arranged in a landscape orientation for displaying content to a user. FIG. 1C shows foldable computing device 100 in a tablet posture where the display panel 105 is generally flat and arranged in a landscape orientation for displaying information to a user. FIG. 1D shows foldable computing device 100 in a canvas posture where the display panel 105 is generally flat and arranged in a portrait orientation for displaying content to a user. FIG. 1E shows foldable computing device 100 in a journal (e.g., a book, bent landscape) posture where the display panel 105 is bent between the first and second portions 104A and 104B, which are each arranged in a portrait orientations to display content to a user.

Figure 2A:
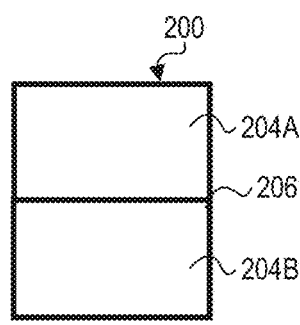
FIGS. 2A-2B are pictorial diagrams of some possible postures of a dual display computing device.
Figure 2B:
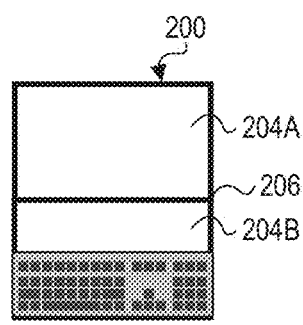

FIGS. 2A-2B show pictorial diagrams of some possible postures of a dual display computing device 200. Dual display computing device 200 includes a first display panel 204A and a second display panel 204B. The first panel 204A may be rotatably connected to the second panel 204B by a hinge 206, which may be configured to permit movement of the panels relative to one another about an axis. Additionally, the first and second panels 204A and 204B may be contained in housing members to which hinge 206 is connected. FIG. 2A shows dual display computing device 200 in a tablet landscape posture where the first and second display panels 204A and 204B are generally flat and are each arranged in a landscape orientation for displaying content to a user. Both display panels 204A and 204B are unobstructed and can be visible to a user. FIG. 2B shows dual display computing device 200 in a tablet posture with an attached peripheral keyboard. Although the first and second display panels 204A and 204B are generally flat and arranged in landscape orientations for displaying information to a user, the peripheral keyboard 206 covers a portion (e.g., bottom half) of the second display panel 204B.

Today's mobile devices (e.g., foldable computing device 100, dual display computing device 200, tablets, smart phones, all-in-one devices, etc.) typically run operating systems that enable rotation of content displayed on their display panel(s) by an appropriate degree (e.g., 0, 90, 180, or 270 degrees) in order to align the displayed content with the current posture of the computing device. Rotation of the content is performed so that the content, when displayed in the display panel, is correctly oriented on the display panel to enable the user to read, comprehend, interact with, or otherwise consume the content.

Computing devices that are operable in multiple postures, however, do not align displayed content to the device posture during pre-boot display and user interactions. A pre-boot stage is generally defined as the time between powering on a computing device and successfully loading an operating system on the computing device. After a computing device has booted up and the operating system has been loaded, however, the device may enter certain states where the device is not completely powered off, but another boot process has to be performed and the operating system has to be loaded again for the device to operate. For example, the Advanced Configuration and Power Interface (ACPI) open standard used by operating systems defines four global (Gx) states and six states (Sx) for ACPI systems:

| Gx | STATE(S) | DESCRIPTION |
| --- | --- | --- |
| G0 Working | S0 | The computer is running and the computer processing unit (CPU) is executing instructions. |
| G1 Sleeping | S0ix | Referred to as the 'Modern Standby' or 'Low Power S0 Idle', where the processor is partially sleeping. |
| | S1-3 | Volatile memory is kept refreshed to maintain the system state. Power is maintained to at least some components to allow the computer to wake in response to appropriate input and return to S0. |
| | S4 | Hibernation—Power consumption is reduced to the lowest level and contents of main memory are saved to a hibernation file to preserve user state. A subsequent boot is needed to wake the CPU but may be performed using the hibernation file. |
| G2 Soft Off | S5 | Soft off—Power is still supplied to the power button and to other components to allow a return to S0. No previous content is retained and a full reboot is required. |
| G3 Mechanical Off | | Computer power has been removed via a mechanical switch |

In ACPI-compliant devices, pre-boot stage can also include the time between waking from certain sleep states (e.g., S4 or S5) that require the operating system to be loaded again and successfully completing the loading of the operating system again.

When a system is powered on, awakened from a certain sleep state (e.g., requiring the operating system to be loaded), or begins a boot process, it typically displays a Signs of Life (SOL) image (e.g., an original equipment manufacturer (OEM) or a product logo) before the operating system is loaded and the processor starts executing. The SOL image may be followed by Basic Input/Output System (BIOS) information and an on-screen keyboard, in some implementations. The OEM or product logo, the BIOS information, and/or the on-screen keyboard may be displayed until the operating system is loaded and the BIOS handoff to the operating system is performed. During a pre-boot stage (e.g., SOL and BIOS), a user may also need to use an on-screen keyboard to enter credentials such as a username and/or a password (e.g., for a password-protected hard drive or encrypted hard drive password) or to change the BIOS settings. Current devices do not have a way of determining device posture to display such pre-boot content and on-screen keyboard in the correct orientation and placement within the display panel for the user.

Current systems display pre-boot content in only one predefined orientation in a display panel of the system. Thus, in order for pre-boot content to be oriented such that it is consumable by a user of the system, a display panel needs to be physically oriented relative to the user based on the predefined orientation for displaying pre-boot content. A device being booted, however, may be oriented in a completely different orientation or posture that can cause confusion and/or render device interaction annoying and difficult if the pre-boot content is displayed sideways or upside down, or is hidden by a keyboard, for example. The annoyance and difficulty can be particularly acute when using newer form factors, such as foldable or dual display devices, because the remedy is to change the device posture during the pre-boot stage, and then change back to the desired device posture after the operating system is loaded.

Current systems rely on the user of a device to physically manipulate (e.g., rotate, turn, etc.) the device into a posture that enables the user to consume (e.g., read, comprehend, or interact with) the displayed pre-boot content. Relying on the user to physically manipulate a device to a particular orientation to consume pre-boot content can result in an undesirable user experience. Users generally expect consistency when operating a computing device. Because content is aligned with a display panel orientation after the operating system is loaded, users generally expect all displayed content (including the pre-boot content) to rotate to follow the display panel orientation to enable user readability, comprehension, and interaction with the content. Consequently, pre-boot content that is not aligned with the device posture may not meet the expectations of the user, which can be frustrating. The inconsistency of content alignment with device posture between pre-boot content and post-boot content can also cause the user to doubt the stability of the system and/or to believe that the system is malfunctioning.

For systems with large display panels (e.g., foldable computing devices with display panels>17 inches), having to change the display device orientation from a preferred posture to another posture in order to consume pre-boot content can be an annoying and frustrating user experience. Rotating the display device may not be as quick and easy as it would be for an eight- or ten-inch tablet or for a smart phone. Moreover, larger dual display and foldable computing devices may require changing the hinge angle as well as rotating the device, to match the predefined pre-boot orientation. Such aspects can further diminish the user experience.

A system for enabling device posture-based pre-boot display orientation can resolve these issues (and more). One or more embodiments of the present disclosure connects system sensors (e.g., accelerometer, gyroscope, compass, temperature sensors, Hall sensors, etc.) in a computing device to a boot controller during the period from a boot controller detecting a power signal when the device is "powered on" (e.g., from G3, S4 or S5 system state) until a handoff to BIOS (e.g., a boot process) for a system boot. The boot controller receives sensor data from the system sensors and processes the sensor data to determine device posture. The boot controller determines posture information based on the posture and provides the posture information to a timing controller (TCON) of a display device to display a Signs of Life (SOL) image, and further provides posture information to BIOS to enable appropriate BIOS screen orientation and on-screen keyboard. The boot controller then hands off control to the processor (e.g., system-on-a-chip (SOC)), and the BIOS continues the boot flow. Additionally, such sensor data can also be processed to enable other usages that require pre-boot user authentication, nearby device and environment intelligence, etc.

Figure 3A:
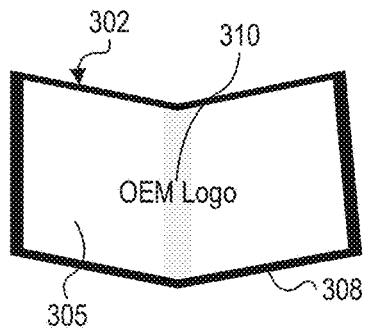
FIGS. 3A-3B are block diagrams illustrating an example default signs of life display orientation in an example computing device in various postures.
Figure 3B:
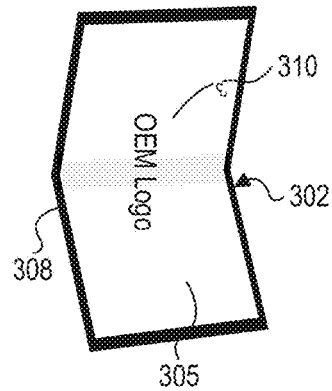

FIGS. 3A-3B are pictorial diagrams illustrating an example predefined (or default) display orientation for a boot screen displayed during the pre-boot stage of a foldable computing device 302 in a journal posture (FIG. 3A) and a laptop posture (FIG. 3B). A "boot screen" is the signs-of-life (SOL) image that is displayed while a computing device is booting up. Foldable computing device 302 may be the same or similar to foldable computing device 100 of FIGS. 1A-1E. In FIGS. 3A-3B, the predefined display orientation is landscape with pre-boot content being displayed in a readable orientation above a particular edge 308 of the display panel 305.

In FIG. 3A, an OEM logo 310 is the SOL image that is displayed in display panel 305 of foldable computing device 302 when the device is powered on or awakened from a certain sleep state, but before a boot process begins. In this example, the OEM logo 310 can be consumed (e.g., read, comprehended) by a user when foldable computing device 302 is in a journal posture with the display panel oriented toward the user such that edge 308 is below the content. However, it may not be an ideal position for the OEM logo 310 or other pre-boot content as it is displayed across a bend in the display panel.

FIG. 3B illustrates what can happen when the display orientation is predefined for content displayed in a pre-boot stage. As shown in FIG. 3B, foldable computing device 302 is rotated clockwise ninety degrees (or counterclockwise 270 degrees) to laptop posture. In this scenario, the OEM logo 310 is also rotated, and becomes difficult to consume (e.g., read, comprehend) as it is displayed in a sideways or ninety degree orientation. Also, it is still positioned across the bend in the display panel, which may further hinder a user's ability to read or otherwise consume the information.

Figure 3C:
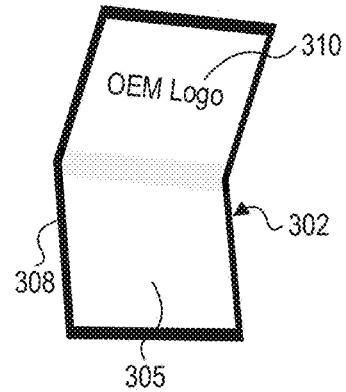
FIG. 3C is a block diagram illustrating another signs of life display orientation in the example computing device of FIGS. 3A-3B, according to an embodiment.

FIG. 3C illustrates foldable computing device 302 enabled with the device posture-based pre-boot orientation system disclosed herein. In FIG. 3C, the foldable computing device 302 is rotated clockwise ninety degrees (or counterclockwise two hundred seventy degrees) to a laptop posture. When the foldable computing device 302 is enabled with the device posture-based pre-boot orientation system, however, the OEM logo 310 is aligned with the device posture and therefore, is consumable by a user.

Figure 4A:
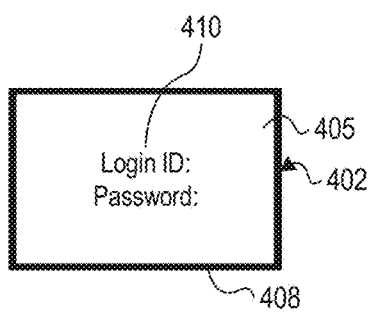
FIGS. 4A-4B are block diagrams illustrating an example default signs of life display orientation in another example computing device in various postures.
Figure 4B:
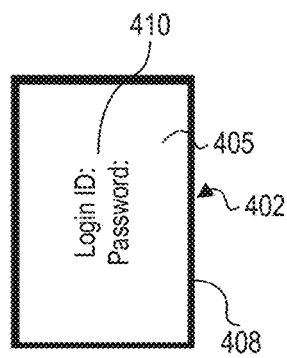

FIGS. 4A-4B are pictorial diagrams illustrating an example predefined (or default) display orientation for BIOS input information displayed during the pre-boot stage of a boot process of a rotatable computing device 402 (e.g., a foldable device, tablet, smart phone, all-in-one device, etc.) having a single flat display panel 405. In FIGS. 4A-4B, the predefined display orientation is landscape with BIOS content being displayed in a readable orientation above a particular edge 408 of the display panel 405. In FIG. 4A, BIOS input information includes a user credentials prompt 410 that is displayed in display panel 405 after a boot process begins, but before an operating system is loaded. In this example, the user credentials prompt 410 is consumable (e.g., readable, comprehensible) by a user when the display panel 405 of computing device 402 is in a tabletop posture, a tablet posture, or a canvas posture with the display panel oriented toward the user such that edge 408 is below the content.

FIG. 4B illustrates what can happen when the display orientation is predefined for content displayed in a pre-boot stage. As shown in FIG. 4B, the computing device 402 is rotated clockwise two hundred seventy degrees (or counterclockwise ninety degrees) to a portrait orientation of the tabletop, tablet, or canvas posture. In this scenario, the user credentials prompt 410 is also rotated, and becomes difficult to consume (e.g., read, comprehend) as it is displayed in a sideways or two hundred seventy degrees orientation.

Figure 4C:
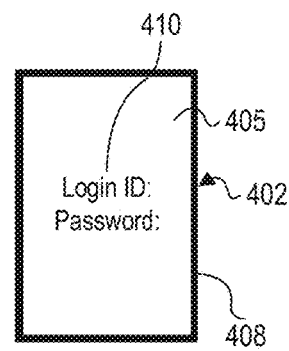
FIG. 4C is a block diagram illustrating a signs of life display orientation in the example computing device of FIGS. 4A-4B, according to an embodiment.

FIG. 4C illustrates computing device 402 enabled with the device posture-based pre-boot orientation system disclosed herein. In FIG. 4C, computing device 402 is rotated clockwise two hundred seventy degrees (or counterclockwise ninety degrees) to a portrait orientation. When computing device 402 is enabled with the device posture-based pre-boot orientation system, however, the user credentials prompt 410 is aligned with the device posture and therefore, is consumable by a user.

FIGS. 5A-5B are pictorial diagrams illustrating an example predefined (or default) display orientation for a boot screen displayed in the pre-boot stage of a dual display computing device 502 in a tablet posture. Dual display computing device 502 may be the same or similar to dual display computing device 200 of FIGS. 2A-2B. Dual display computing device 502 includes a first display panel 504A, a second display panel 504B, and a removable peripheral (e.g., keyboard) 520. The first panel 504A may be rotatably connected to the second panel 504B by a hinge 506, which may be configured to permit movement of the panels relative to one another about an axis. Additionally, the first and second panels 504A and 504B may be contained in housing members to which hinge 506 is connected. In FIGS. 5A-5B, the predefined display orientation for each display panel 504A and 504B is landscape with pre-boot content being displayed in a readable orientation above a particular edge 508 of the second display panel 504B.

In FIG. 5A, an OEM logo 510 is the SOL image that is displayed in the second display panel 504B of dual display computing device 502 when the device is powered on or awakened from a certain sleep state, but before a boot process begins. In this example, the OEM logo 510 is consumable (e.g., readable, comprehensible) by a user when dual display computing device 502 is in a laptop posture, tablet posture or other posture in which the second display panel 504B is oriented such that edge 508 is below the content, and when peripherals that cover at least part of the display panel are not present.

FIG. 5B illustrates what can happen when the display orientation is predefined for content displayed in the pre-boot stage and the posture of the device is modified to include a peripheral, such as a keyboard 520, attached to a lower portion of the second display panel 504B. In this scenario, the OEM logo 510 is at least partially hidden behind the keyboard 520 and becomes difficult to consume (e.g., read, comprehend).

FIG. 5C illustrates the dual display computing device 502 enabled with the device posture-based pre-boot orientation system disclosed herein. In FIG. 5C, the posture is modified to include a peripheral, such as keyboard 520, attached to a lower portion of the second display panel 504B. When the dual display computing device 502 is enabled with the device posture-based pre-boot orientation system, however, the OEM logo 510 is moved so that it is displayed entirely within a visible (or unobstructed) portion of the second display panel 504B and therefore, is consumable by a user. It should be noted that the OEM logo 510 could be moved to the first display panel 504A in other embodiments.

Embodiments of a system for enabling device posture-based pre-boot display orientation, as disclosed herein and graphically depicted in FIGS. 3C, 4C, and 5C, advantageously eliminate user confusion and/or annoyance and frustration that may be caused by the wrong orientation and/or placement of displayed pre-boot content and an on-screen keyboard with respect to device postures. In particular, users of foldable and dual display systems may benefit from one or more embodiments as these systems may be cumbersome and more difficult to manipulate to the correct posture. Furthermore, ensuring a seamless user experience can build a user's confidence as to the stability of the system.

Figure 6:
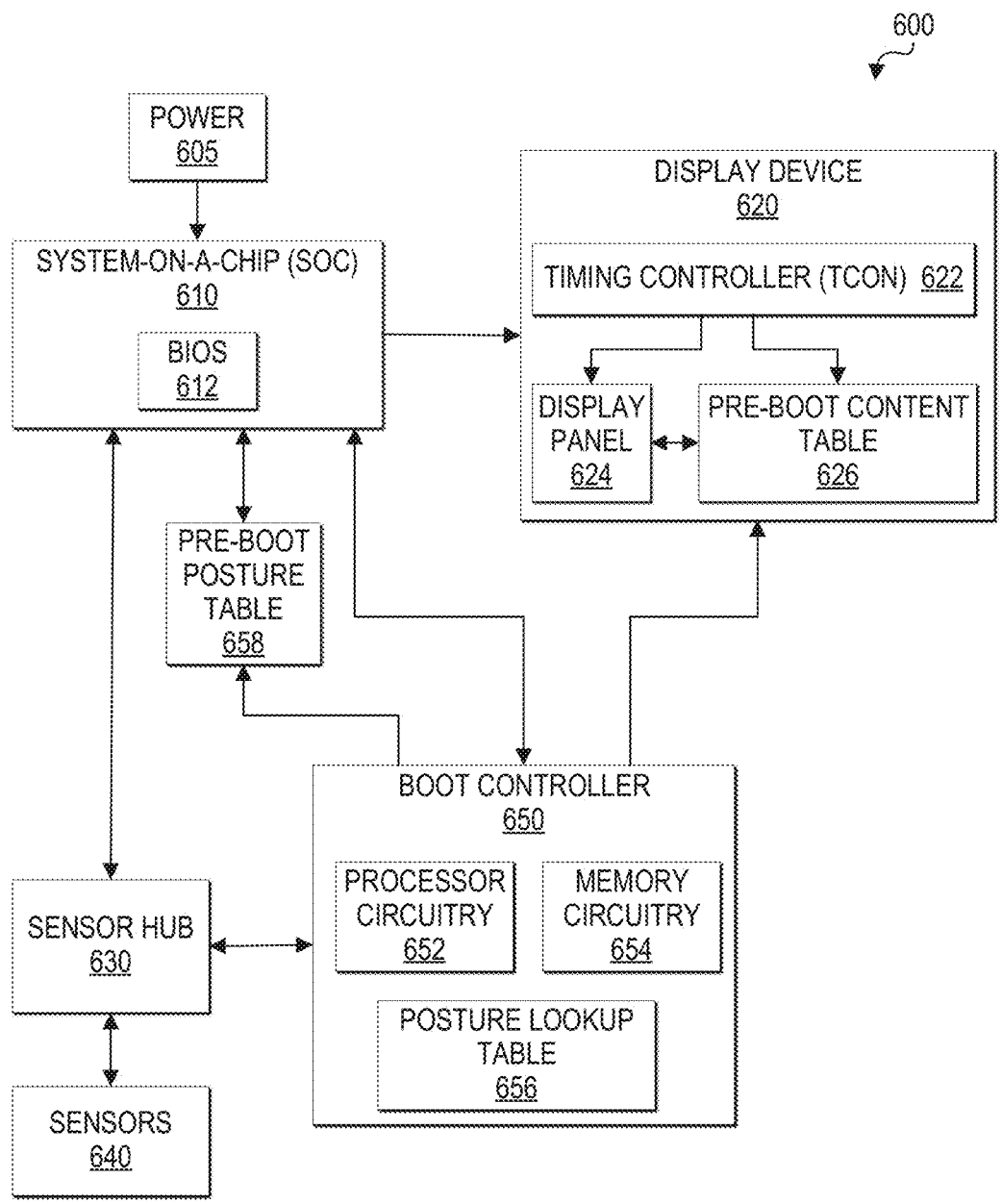
FIG. 6 is a block diagram of one possible embodiment of a system including device posture-based pre-boot display orientation according to an embodiment.

Turning to FIG. 6, FIG. 6 is a simplified block diagram of a computing device 600 configured to enable device posture-based pre-boot display orientation. Device 600 may include any combination of components, some of which are shown by way of example in FIG. 6. These components may be implemented as integrated circuits, discrete computing devices, or other modules, logic, hardware, software, firmware, or any suitable combination thereof adapted in a computing device, or as components otherwise incorporated within a chassis of the computing device. FIG. 6 is intended to show a high-level view of many components of the computing device. However, it is to be understood that some of the components shown may be omitted, additional components may be present, and different arrangement of the components shown may occur in other implementations.

By way of example, computing device 600 may be a laptop computer, a mobile computing device, a tablet, a phablet, an all-in-one device, a dual display device, a foldable computing device, a wearable device, or any other computing device that includes at least one display panel and that can be operated in multiple postures (e.g., different orientations of display panel relative to a user, peripherals being present or absent, etc.).

In at least one embodiment, computing device 600 includes a system-on-a-chip (SOC) 610, a display device 620 with a timing controller (TCON) 622, a sensor hub 630 connected to one or more sensors 640, and a boot controller 650. Computing device 600 may also include a posture lookup table 656 that is accessible by boot controller 650, a pre-boot content table 626 that is accessible by TCON 622, and a pre-boot posture table 658 that is accessible by the boot controller 650 and by SOC 610. Computing device 600 may comprise other components including, but not necessarily limited to memory, storage, user interface (e.g., touch pad, keyboard, trackball, etc.), battery, microphones, cameras, touch controller, and external ports.

The SOC 610 of computing device 600 may comprise one or more processors integrated with one or more additional components, such as a memory controller, a graphics processing unit (GPU), an image processing unit (IPU), caches, and other components. SOC 610 also can include a basic input/output system (BIOS) 612 that runs after power 605 is supplied to the SOC 610 to power on the device. BIOS 612 can use a boot loader to load and boot system peripherals and a memory controller to load an operating system for the SOC 610. In one or more embodiments, BIOS 612 is initialized after boot controller 650 determines the current posture of computing device 600 and a SOL image is displayed. It should be noted that, although an SOC is one possible implementation, other computing system configurations may alternatively be used to enable device posture-based pre-boot display orientation as disclosed herein.

In at least one implementation, sensor hub 630 may be configured as a processing unit communicatively coupled to SOC 610 and boot controller 650, but separately implemented. For example, sensor hub 630 could be a microcontroller, a digital signal processor (DSP), or any other processing unit capable of receiving sensor data from one or more sensors 640, processing the sensor data, and communicating the processed sensor data to boot controller 650 during the pre-boot stage or to SOC 610 once the operating system is loaded. Sensors 640 can include various sensors that provide sensor data that can be used to determine a posture of computing device 600. Examples of sensors 640 used to determine the posture of a device can include any one or more of an accelerometer (e.g., single-axis and/or multi-axis), a gyroscope, a compass, a geomagnetic field sensor, and/or a Hall sensor (e.g., for detecting the presence of a peripheral such as a keyboard over a display panel). Sensors 640 may also include other sensors that provide information to the device for various usages. Sensor hub 630 may be configured to process the received sensor data (e.g., streams of data) into a form that can be easily understood and used by boot controller 650 during the pre-boot stage and by SOC 610 in the post-boot stage (i.e., once the operating system has been successfully loaded). In one example, the sensor data received in the pre-boot stage could be processed into a single compressed data stream and provided to boot controller 650.

Sensor hub 630 may be implemented in numerous other different configurations. In another implementation, sensor hub 630 may be integrated with boot controller 650 and communicatively coupled to SOC 610. In yet another implementation, sensor hub 630 may be integrated with SOC 610. In this implementation, a power plane in the SOC 610 can be configured to allow the integrated sensor hub to power up within the SOC 610 before other components (e.g., processors, memory controller, etc.) power up and before the boot flow (e.g., BIOS 612) is initiated. Additionally, a data plane may be configured to facilitate communication from the integrated sensor hub to boot controller 650 so that the boot controller can receive the processed sensor data during the pre-boot stage before the boot controller's handoff to BIOS 612 during system boot.

In at least one embodiment, boot controller 650 may be configured as an embedded controller, which may be implemented separately from SOC 610 and sensor hub 630. In other implementations, boot controller 650 may be integrated with sensor hub 630 and separate from SOC 610. In yet other implementations, boot controller 650 may be integrated with SOC 610. Boot controller 650 is configured to detect a power signal when the system is powered on (e.g., from G3, S4, or S5 system states). A power signal generally refers to a signal that corresponds to a user action or another event that is intended to activate, reboot, or restart a computer system. Boot controller 650 is also configured to power up before SOC 610 (e.g., before an SOC reset is released) in a pre-boot stage of the computing device 600, and to receive sensor data from sensor hub 630 during the pre-boot stage before the handoff to BIOS 612.

In at least one embodiment, boot controller 650 can include processor circuitry 652 and memory circuitry 654 along with any other computing components (e.g., signal registers, I/O components, etc.) needed to perform pre-boot operations to effect device posture-based pre-boot display orientation. Memory circuitry 654 may include any non-volatile and/or volatile memory devices such as random access memory (RAM), read-only memory (ROM), flash ROM, programmable read-only memory (PROM), erasable programmable read-only memory (EPROM), electrically erasable programmable read-only memory (EEPROM), etc. Firmware may be stored in memory circuitry (e.g., nonvolatile memory such as ROM or flash ROM) and, in at least one implementation, may perform control, monitoring, and data manipulation functions of boot controller 650. Processor circuitry 652 may include any suitable central processing unit (CPU) capable of facilitating the activities of boot controller 650 as described herein.

Using the sensor data received from sensor hub 630, the boot controller 650 can determine a posture of computing device 600. In at least one embodiment, the posture of the computing device 600 can be defined by one or more parameters including, but not necessarily limited to, the orientation (e.g., degrees the device is rotated) of the device or display panel of the device, the presence or absence of a peripheral (e.g., external keyboard) affecting the exposure of a display panel, a hinge angle of a hinge that connects housing members of a computing device, or any combination thereof. These posture parameters can be derived by the boot controller 650 based on the sensor data. Boot controller 650 can communicate posture information to TCON 622 of display device 620 during the pre-boot stage, where the posture information represents the determined posture of the computing device 600. The posture information can be communicated via general-purpose input/outputs (GPIOs), flags or interrupts, etc.

In one embodiment, boot controller 650 can use posture lookup table 656 to select posture information that represents the posture of computing device 600. Posture lookup table 656 can map posture information (e.g., representative values) to particular posture parameters derived from sensor data. The postures that are possible depend on the type of the computing device and the parameters that can be derived from the sensor data. A nonlimiting example of a posture lookup table could include posture information (e.g., representative values) mapped to different combinations of the orientation of the display device (e.g., in degrees) and the presence/absence of a keyboard (e.g., yes/no indication):

| Posture Information | Orientation | Keyboard |
|---|---|---|
| 0 | 0 | No |
| 1 | 90 | No |
| 2 | 180 | No |
| 3 | 270 | No |
| 4 | 0 | Yes |
| 5 | 90 | Yes |
| 6 | 180 | Yes |
| 7 | 270 | Yes |

In this embodiment, boot controller 650 can derive posture parameters from the sensor data and use the posture parameters to search the lookup table and select the corresponding posture information. Boot controller 650 can then communicate the posture information to TCON 622 of display device 620. It should be noted that any suitable communication mechanism may be used including, but not necessarily limited to general-purpose input/outputs (GPIOs), I2C, flags or interrupts, etc.

It should be noted that the posture lookup table above is offered for illustration purposes only, and that such a table may be configured in any suitable manner based on particular devices, implementations and/or needs. For example, any number of parameters and/or combination of parameters may be used to determine device posture. Hinge angle is another parameter that may be considered in combination with orientation, in combination with keyboard presence/absence, in combination with both orientation and keyboard presence/absence, or in combination with any other parameters derived from sensor data related to a computing device.

In one example, a parameter derived from sensor data to indicate a hinge angle may be used to determine whether to move the content so that it is not centered on a display panel. This can prevent the content from being displayed across a bend in the display panel (See e.g., FIGS. 3A-3B) of a foldable device when the foldable device is in a journal posture or laptop posture, for example.

In another embodiment, boot controller 650 can select a correctly aligned bitmap with desired pre-boot content to be displayed based on the sensor data received from sensor hub 630. For example, posture parameters can be derived from the sensor data. The boot controller can use the parameters and the desired pre-boot content to select (e.g., from a table) or render a bitmap to be displayed. Boot controller 650 can then send the selected or rendered bitmap to the display device 620 to be displayed. In this scenario, the posture information is included in the bitmap and therefore, is communicated to the display device via the bitmap.

In at least one embodiment, pre-boot posture table 658 that is accessible to both the boot controller 650 and the SOC 610, may be implemented in computing device 600. More specifically, pre-boot posture table 658 may be accessible to a boot process once the boot controller initializes the BIOS 612 and starts the boot process, and to an operating system once the operating system is loaded by the boot process. Pre-boot posture table 658 may be populated by the boot controller with information that indicates the posture of the computing device 600 as determined by the boot controller 650 during the pre-boot stage. By way of example, the information may include the posture parameters derived from the sensor data received from the sensor hub. In some embodiments, the information used to populate pre-boot posture table 658 may include the sensor data received by the boot controller 650, posture information that is selected by the boot controller 650 from posture lookup table 656, and/or any other suitable information that can indicate the posture of computing device 600.

In some scenarios, the boot process may use the information in pre-boot posture table 658 to determine the presence or absence of a hardware peripheral as determined by the boot controller 650. The boot process can use this information, along with the orientation of display device 620 (which may be provided to the BIOS 612 during handoff from the boot controller 650) to render pre-boot BIOS content for display on display device 620. In some scenarios, the operating system may use the information in pre-boot posture table 658 before the operating system is able to access updated sensor data, in order to render content to be displayed before the updated sensor data is accessible or available to the operating system. Pre-boot posture table 658 may be integrated with boot controller or any other component that is accessible to boot controller 650 and the boot process during the pre-boot stage, and that is accessible to the operating system after the operating system has been loaded (i.e., post-boot stage).

Display device 620 of the computing device 600 may be operably connected to SOC 610 and, in some cases, movably connected to SOC 610. For example, in a laptop computer, a hinge can movably connect display device 620 to a base housing that contains SOC 610. In a mobile computing device, display device 620 may be operably connected to SOC 610 within the same housing. These nonlimiting examples are provided for illustrative purposes and it should be appreciated that embodiments herein could be implemented using any computing device configuration that is operable in multiple postures.

Display device 620 includes a display panel 624, timing controller 622, and possibly other components such as microphones, cameras, and/or a touch controller. TCON 622 converts video data received from the SoC 610 into signals that drive the display panel 624. The display panel 624 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. When touchscreen technology is implemented in display device 620, a touch controller drives the touchscreen technology utilized in the display panel 624 and collects touch sensor data provided by the employed touchscreen technology.

In at least one embodiment, display device 620 includes a pre-boot content table 626. Pre-boot content table 626 can map posture information (e.g., representative values) representing particular postures to bitmaps of pre-boot content. Each bitmap can store the pre-boot content in a different arrangement (e.g., orientation and placement) based on the posture information. TCON 622 can use the posture information received from boot controller 650 to search the pre-boot content table 626 to identify the corresponding bitmap to be displayed in display panel 624. The bitmap can be displayed on display panel 624. A nonlimiting example of a pre-boot content table 626 could include posture information (e.g., representative values) mapped to bitmaps of pre-boot content such as signs-of-life images:

| Posture Information | Bitmap |
|---|---|
| 0 | signs_of_life_0_no_kb.bmp |
| 1 | signs_of_life_90_no_kb.bmp |
| 2 | signs_of_life_180_no_kb.bmp |
| 3 | signs_of_life_270_no_kb.bmp |
| 4 | signs_of_life_0_kb.bmp |
| 5 | signs_of_life_90_kb.bmp |
| 6 | signs_of_life_180_kb.bmp |
| 7 | signs_of_life_270_kb.bmp |

Display device 620 can display the selected bitmap (e.g., SOL image) on display panel 624. The pre-boot content is displayed in an arrangement that aligns the pre-boot content with the device posture, such that the pre-boot content has the correct orientation and placement within the display panel to enable the content to be consumed by a user. Additionally, boot controller 650 can set the display panel orientation and/or the hardware peripheral presence, for the BIOS flow to follow.

It should be apparent that the particular aspects of communicating device posture to the display device (e.g., TCON) and the SOC (e.g., BIOS) are for illustrative purposes only and that many other implementations are possible and are considered to be within the broad scope of this disclosure. In one illustrative example of the numerous possible implementations, the posture information that is communicated to the TCON may include the orientation parameter, the peripheral presence parameter (e.g., keyboard parameter), and a hinge angle parameter rather than a single representative value. Accordingly, in this case, the pre-boot content table 626 could be modified to map bitmaps to the various combinations of the orientation, peripheral presence, and hinge angle parameters.

Figure 7:
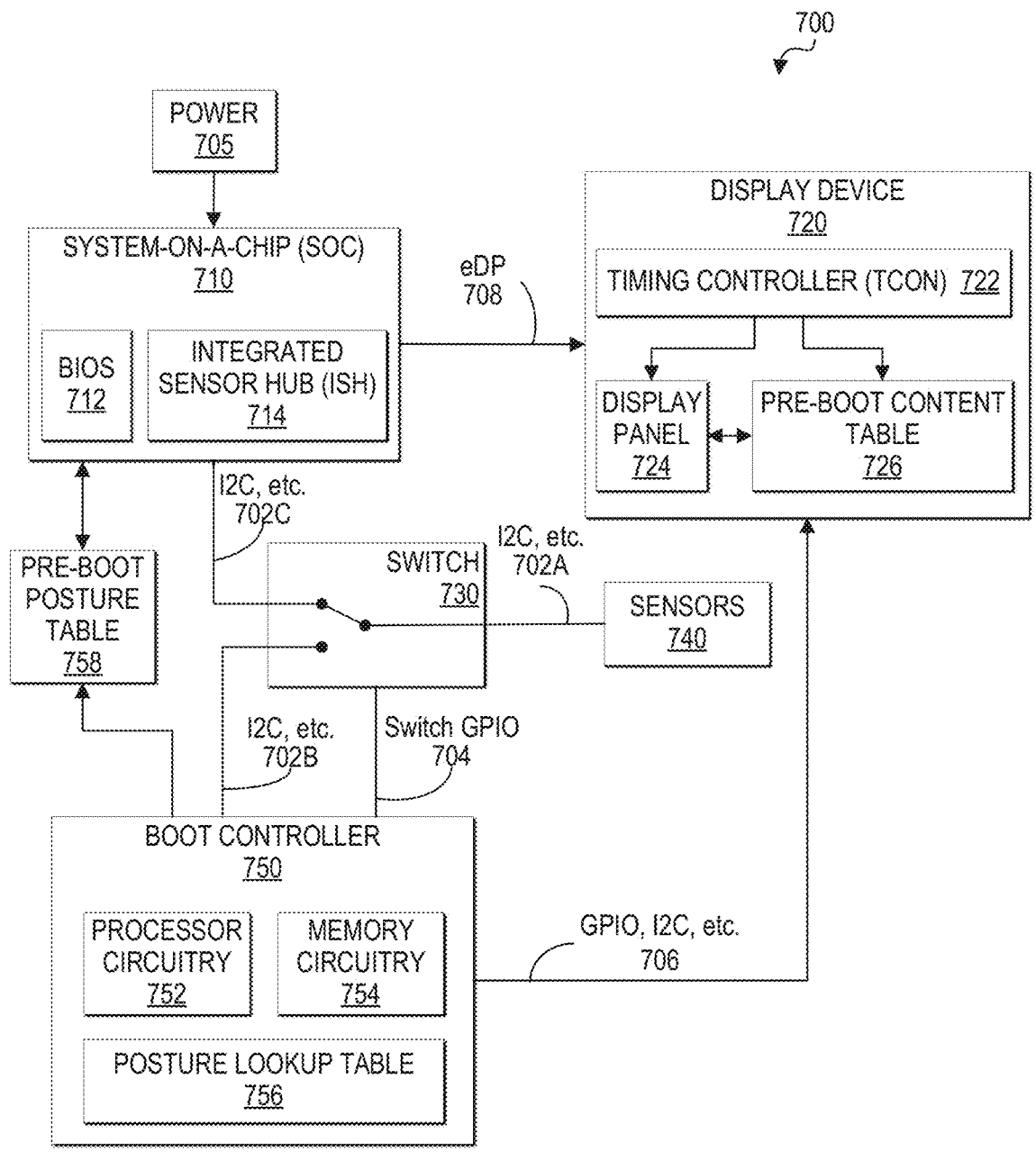
FIG. 7 is a block diagram of another possible embodiment of a system including device posture-based pre-boot display orientation according to an embodiment.

FIG. 7 is a simplified block diagram of another hardware implementation for a computing device 700 configured to enable device posture-based pre-boot display orientation. Device 700 may include any combination of components, some of which are shown by way of example in FIG. 7. These components may be implemented as integrated circuits, discrete computing devices, or other modules, logic, hardware, software, firmware, or any suitable combination thereof adapted in a computing device, or as components otherwise incorporated within a chassis of the computing device. FIG. 7 is intended to show a high-level view of many components of the computing device. However, it is to be understood that some of the components shown may be omitted, additional components may be present, and different arrangement of the components shown may occur in other implementations.

Similar to computing device 600, computing device 700 may be a laptop computer, a mobile computing device, a tablet, a phablet, an all-in-one device, a dual display device, a foldable computing device, a wearable device, or any other computing device that includes at least one display panel and that can be operated in multiple postures (e.g., different orientations of display panel relative to a user, peripherals being present or absent, etc.).

Computing device 700 includes a system-on-a-chip (SOC) 710 with an integrated sensor hub 714, a display device 720 with a timing controller (TCON) 722 and a display panel 724, a switch 730 connected to one or more sensors 740, and a boot controller 650. Computing device 700 may also include a posture lookup table 756 that is accessible by boot controller 750, a pre-boot content table 726 that is accessible by TCON 722, and a pre-boot posture table 758 that is accessible by both the boot controller 650 and by the SOC 710. Posture lookup table 756, pre-boot content table 726, and pre-boot posture table 758 may be similar to corresponding components (e.g., posture lookup table 656, pre-boot content table 626, pre-boot posture table 658) shown and described with reference to computing device 600 in FIG. 6. Computing device 700 may comprise other components including, but not necessarily limited to memory, storage, user interface (e.g., touch pad, keyboard, trackball, etc.), battery, microphones, cameras, touch controller, and external ports The SOC 710 of computing device 700 may be comprise one or more processors integrated with one or more additional components, such as a memory controller, a graphics processing unit (GPU), an image processing unit (IPU), caches, and other components. SOC 710 also can include a basic input/output system (BIOS) 712 that runs after power 705 is supplied to the SOC 710 to power on the device. BIOS 712 can use a boot loader to load and boot system peripherals and a memory controller to load an operating system for the SOC 710. In one or more embodiments, BIOS 712 is initialized after boot controller 750 determines the current posture of computing device 700 and an SOL image is displayed. SOC 710 may be coupled to display device 720 via any suitable display interface including, but not necessarily limited to an embedded display port (eDP) 708. In another nonlimiting example, SOC 710 could be coupled to display device 720 via an MIPI display serial interface (DSI).

SOC 710 also includes integrated sensor hub (ISH) 714, which may be configured as a co-processor. For example, ISH 714 could be a microcontroller, a microprocessor, a digital signal processor (DSP), or any other processing unit capable of receiving sensor data from one or more sensors 740, processing the sensor data, and communicating the processed sensor data to the operating system (or other components) of SOC 710. A sensor hub driver may be provided in SOC 710 to enable communication between the operating system and the ISH 714.

Sensors 740 in computing device 700 can include various sensors as described with reference to sensors 640 of computing device 600 in FIG. 6, for example. In one implementation, switch 730 is provisioned in computing device 700 to enable sensors 740 to be connected to either the boot controller 750 or to ISH 714 at the appropriate time. In one example, sensor interfaces are multiplexed between ISH 714 on the SOC 710 and boot controller 750. Switch 730 connects sensor interfaces to boot controller 750 during a period of the pre-boot stage when the system is powered on from G3, S4, or S5 system states to the handoff by the boot controller 750 to BIOS 712 during the boot flow. After the handoff to BIOS 712, boot controller 750 causes switch 730 to change the communication flow from sensors 740 by connecting the sensor interfaces to the ISH 714 on the SOC 710.

In one implementation, connections 702A, 702B, and 702C between sensors 740 and boot controller 750 and ISH 714 can be achieved using I2C serial communication protocol or some other suitable communication protocol. Switch 730 may be activated by boot controller 750 via a GPIO 704 digital signal pin. Additionally, the switched sensor interfaces can be implemented using any interface required for sensor connectivity and not limited to I2C only. Depending on the capability of the sensor interfaces, a switch may or may not be required if the interface support multi master mode, etc.

In at least one embodiment, boot controller 750 may be configured as an embedded controller, which may be implemented separately from SOC 710 and ISH 714. In another implementation, boot controller 750 may be integrated with SOC 710. In at least one embodiment, boot controller 750 can include processor circuitry 752 and memory circuitry 754 along with any other computing components (e.g., signal registers, I/O components, etc.) needed to perform pre-boot operations to effect device posture-based pre-boot display orientation. In one or more embodiments, boot controller 750 may be configured in the same or similar manner as boot controller 650.

Boot controller 750 is configured to detect a power signal when the system is powered on (e.g., from G3, S4, or S5 system states) by a user action or another event intended to activate, reboot, or restart the system. Boot controller 750 is also configured to power up before SOC 710 (e.g., processor and memory controller) in a pre-boot stage of the computing device 700, to activate switch 730 to connect sensors 740 to boot controller 750, and to receive sensor data from sensors 740 in the pre-boot stage before the boot controller hands off to the BIOS.

When system power up is initiated (e.g., by power 705), before an SOC reset is released, boot controller 750 has access to sensors 740. Boot controller 750 can determine the posture of the computing device 700 based on the sensor data received from the sensors. For example, parameters such as orientation, the presence/absence of a peripheral keyboard, and a hinge angle may be derived from the sensor data and define the posture of the device. In one embodiment, boot controller 750 can use the parameters to search posture lookup table 756 to select posture information that represents the posture of the device. Boot controller 750 can communicate the posture information to TCON 722 of display device 720 via general-purpose input/outputs (GPIOs), I2C, flags or interrupts, etc. The boot controller 750 then prompts the switch 730 to switch the sensors 740 to ISH 714 and initializes the BIOS 712. A BIOS flow (or boot process) continues to boot the system normally with screen images displayed, and on-screen keyboard enabled (if available) as per device orientation.

In another embodiment, boot controller 750 can select a correctly aligned bitmap with desired pre-boot content to be displayed based on the sensor data received from sensors 740. For example, posture parameters can be derived from the sensor data. The boot controller can use the parameters and the desired pre-boot content to select (e.g., from a table) or render a bitmap to be displayed. Boot controller 750 can then send the selected or rendered bitmap to the display device 720 to be displayed. In this scenario, the posture information is included in the bitmap and therefore, is communicated to the display device via the bitmap.

In at least one embodiment, a pre-boot posture table 758 that is accessible to both the boot controller 750 and the SOC 710, may be implemented in computing device 700. More specifically, pre-boot posture table 758 may be accessible to a boot process once the boot controller initializes the BIOS 712 and starts the boot process, and to an operating system once the operating system is loaded by the boot process. Pre-boot posture table 758 may be populated by the boot controller with information that indicates the posture of the computing device 700 as determined by the boot controller 750 during the pre-boot stage. By way of example, the information may be the same or similar as described with reference to the information stored in pre-boot posture table 658 of computing device 600.

In some scenarios, the boot process may use the information in pre-boot posture table 758 to determine the presence or absence of a hardware peripheral as determined by the boot controller 750. The boot process can use this information, along with the orientation of display device 720 (which may be provided to the BIOS 712 during handoff from the boot controller 750) to render pre-boot BIOS content for display on display device 720. In some scenarios, the operating system may use the information in pre-boot posture table 758 before the operating system is able to access updated sensor data via ISH 714, in order to render content to be displayed before the updated sensor data is accessible or available to the operating system. Pre-boot posture table 758 may be integrated with boot controller 750 or any other component that is accessible to boot controller 750 and the boot process during the pre-boot stage, and that is accessible to the operating system after the operating system has been loaded (i.e., post-boot stage).

Display device 720 of the computing device 700 may be operably connected to SOC 710 and, in some cases, movably connected to SOC 710 in one of the same or similar configurations shown and described with reference to display device 620 and SOC 610 of FIG. 6. Display device 720 may also be configured in one of the same or similar configurations shown and described with referend to display device 620 of FIG. 6. Display device 720 may receive posture information from boot controller 750. In one embodiment, the posture information may be used to search pre-boot content table 726 for a bitmap to be displayed with pre-boot content such as an SOL image. In another embodiment, display device 720 may receive, from boot controller 650, a bitmap to be displayed on display panel 724, where the received bitmap incorporates the posture information to cause the pre-boot content to be displayed in the correct orientation, based on the posture of the device, for consumption by a user. Additionally, boot controller 750 can set the display panel orientation and/or the hardware peripheral presence, for the BIOS flow to follow It should also be noted that embodiments (e.g., computing devices 600, 700) shown and described herein to enable device posture-based pre-boot display orientation can be include other features to enable new usages requiring system/device response ahead of operating system readiness. These other features can be implemented with input from different sensors. This can improve user experience by creating an impression of quick system responses.

Figure 8A:
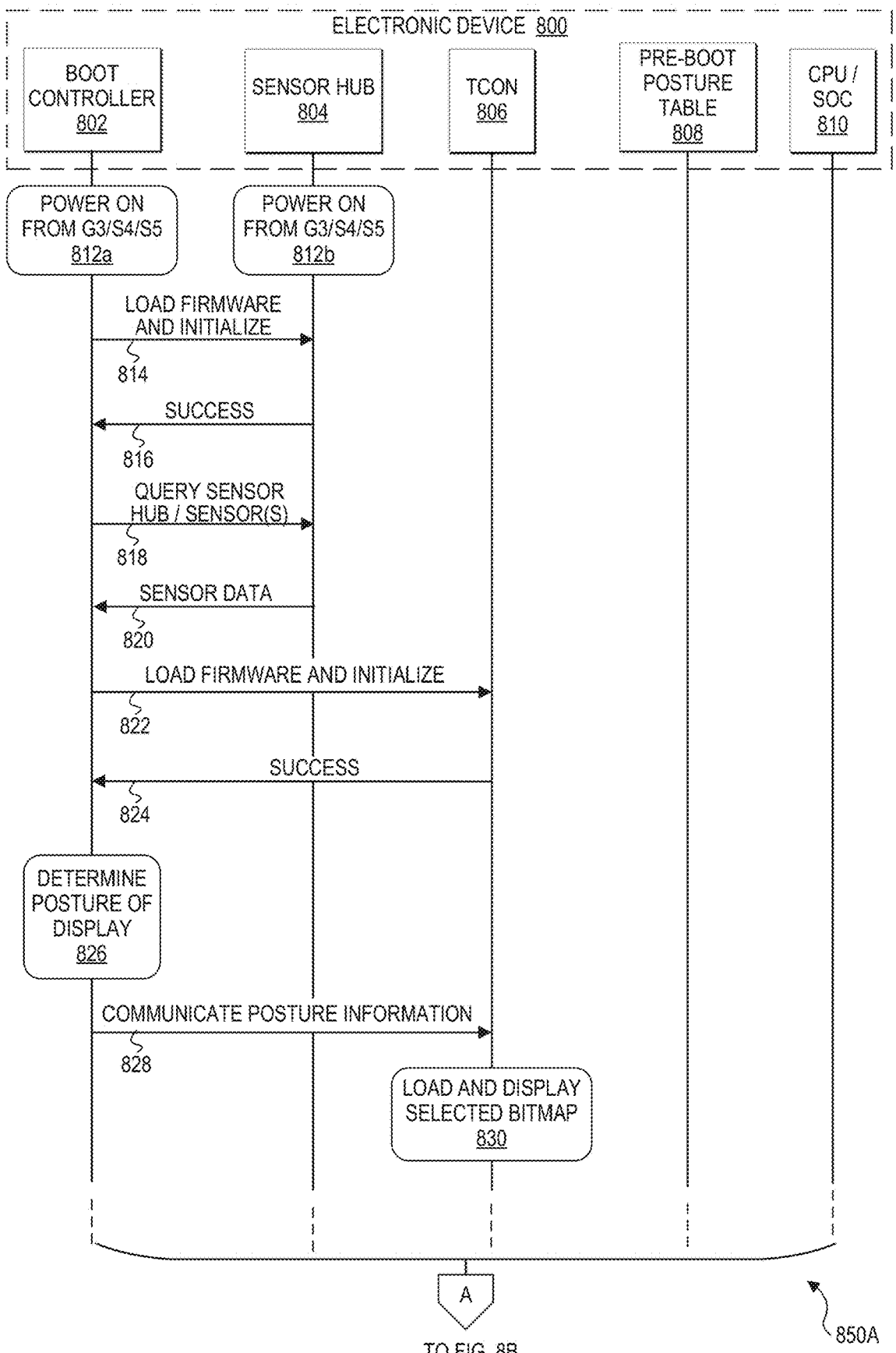
FIGS. 8A-8B are simplified interaction diagrams illustrating example interactions and operations for realizing device posture-based pre-boot display orientation according to an embodiment.
Figure 8B:
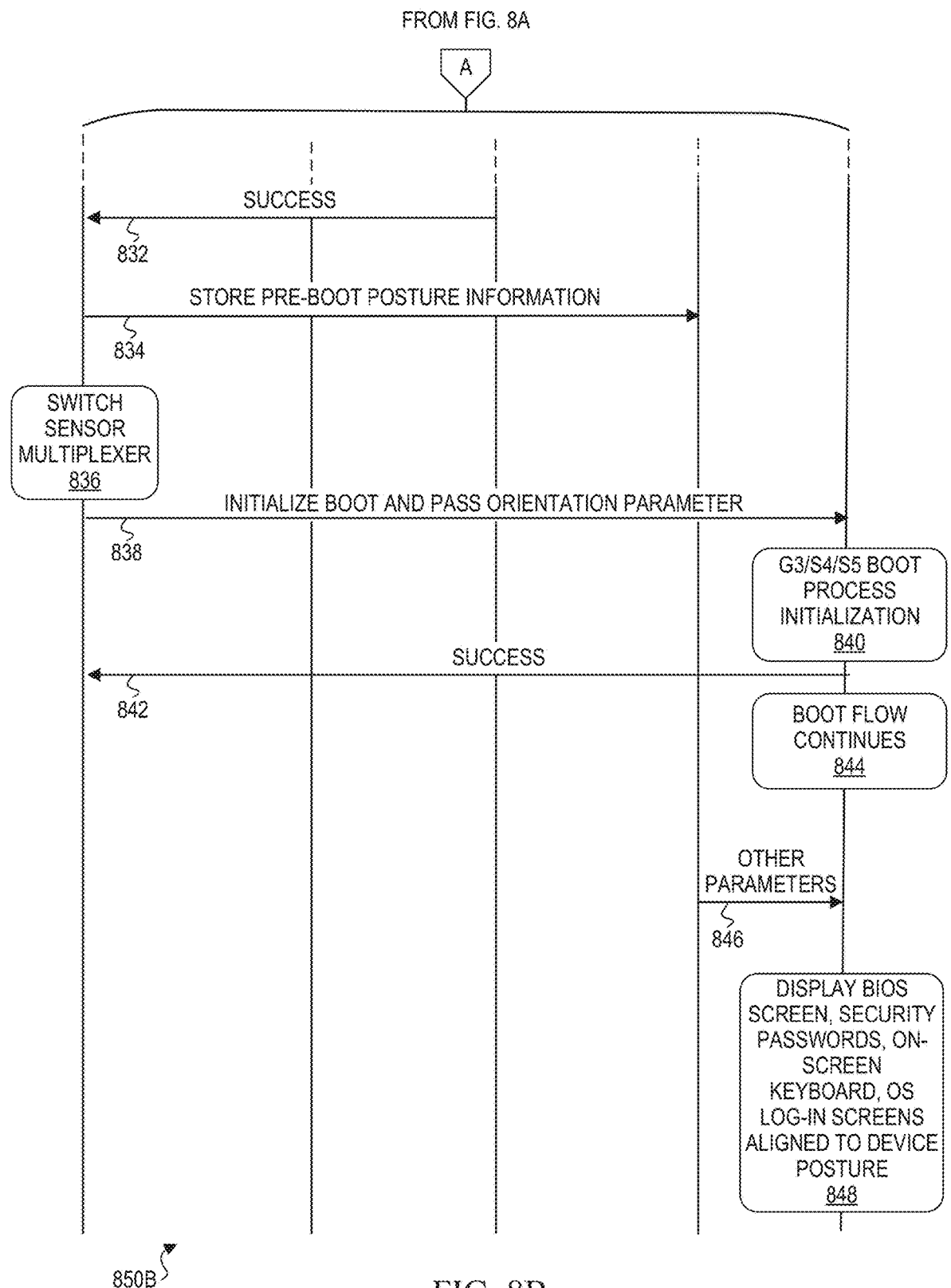

Turning to FIGS. 8A-8B, simplified interaction diagrams 850A-850B illustrating an example process for realizing device posture-based pre-boot display orientation according to an embodiment. In this example, a computing device 800 comprises components having the same or similar configuration as components in embodiments of computing devices or systems described herein (e.g., computing device 600 or 700). For example, the process shown in interaction diagrams 850A-850B may be performed via interactions among a boot controller 802 (e.g., similar to boot controllers 650 or 750), a sensor hub 804 (e.g., similar to sensor hub 630 or integrated sensor hub 714), a timing controller (TCON) 806 (e.g., similar to TCONs 622 or 722), a pre-boot posture table 808 (e.g., similar to pre-boot posture tables 658 or 758), and a CPU/SOC 810 (e.g., similar to SOCs 610 or 710) to display pre-boot content in a correct orientation based on device posture.

In FIG. 8A, the process begins when the computing device 800 is powered on from a G3, S4, or S5 system state. Power is detected at 812a by boot controller 802 and at 812b by sensor hub 804. At 814, the boot controller 802 loads firmware and initializes sensor hub 804. At 816, boot controller 802 receives a signal from sensor hub 804 indicating that the sensor hub has been successfully initialized.

At 818, if the sensor hub 804 has been successfully initialized, boot controller 802 queries the sensor hub 804 for sensor data. In some implementations, if a switch is used to connect sensors to boot controller 802 directly, then the boot controller 802 may query the sensors for sensor data. At 820, boot controller 702 receives sensor data from sensor hub 804 (or from the sensors directly when boot controller 802 is connected to the sensors directly).

At 822, boot controller 802 loads firmware and initializes TCON 806 of a display device in computing device 800. At 824, boot controller 802 receives a signal from TCON 806 indicating that the TCON has been successfully initialized.

At 826, boot controller 802 determines a posture of the display device of computing device 800. The posture can be determined by deriving posture parameters from the sensor data received at 820. Parameters can include, for example, orientation of the display device (or the display panel of the display device), an indication of whether a peripheral component (e.g., keyboard) is present on the display device, and/or a hinge angle of a hinge that connects housing members (e.g., containing display panels) of the computing device. By way of example, the orientation of the display device may be determined as a degree of rotation measured in relation to a default or standard posture. In at least one implementation, the display device is designated as having an orientation of zero degrees (0°) when the computing device is in the default or standard posture. Accordingly, other degrees of rotation that can be detected for the orientation of the display device may include ninety degrees (90°), one hundred eighty degrees (180°), and two hundred seventy degrees (270°).

Boot controller 802 can also select posture information that corresponds to the parameters that define the posture. In at least one embodiment, the posture information that corresponds to the posture parameters is selected from a posture lookup table (e.g., posture lookup table 656 or 756). At 828, the posture information is communicated to TCON 806. In one embodiment, TCON 806 can use the posture information to select a bitmap with an SOL image to be displayed in the correct orientation on the computing device 800.

At 830, TCON 806 loads and displays the selected (or rendered) bitmap with pre-boot content, such as an SOL image. With reference to interaction diagram 850B in FIG. 8B, at 832, boot controller 802 receives a signal from TCON 806 indicating that the TCON successfully displayed the bitmap (e.g., SOL image).

At 834, boot controller 802 stores pre-boot posture information in pre-boot posture table 808. Pre-boot posture information may indicate, fully or partially, the posture of the device determined by boot controller 802. For example, the pre-boot posture information may include all of the parameters derived by boot controller 801 (e.g., orientation parameter, peripheral presence parameter, hinge angle parameter, etc.). In other embodiments, some of the parameters may be passed to SOC 810 (e.g., when a boot process is initiated) by boot controller 802 and therefore, the stored pre-boot posture information may include only the parameters that are not passed to SOC 810. For example, an orientation parameter may be passed to SOC 810 by boot controller 802 and, therefore, a peripheral presence parameter and/or a hinge angle parameter may be stored in pre-boot posture table 808. In other embodiments, the pre-boot content may include the posture information selected by boot controller 802 from the posture lookup table (e.g., 656, 756), the sensor data received by boot controller 802, or any other information indicative of the posture of computing device 800.

In an implementation in which the sensor hub is an integrated sensor hub (ISH) in SOC 810, sensors may be multiplexed between boot controller 802 and the ISH. Accordingly, in this implementation, at 836, prior to the handoff to the BIOS in the SOC to start the boot process, boot controller 802 can activate a switch to cause the communication from the sensors to flow to the ISH instead of to the boot controller.

At 838, boot controller 802 passes control to the BIOS on the SOC 810 to initialize a boot process (e.g., from G3, S4 or S5 system states). Boot controller 802 can also pass an orientation parameter that indicates the orientation of the display device as detected by the boot controller. At 840, the boot process is initialized. At 842, boot controller 802 receives a signal from SOC 810 indicating that the boot flow was successfully initialized and the BIOS handoff is completed. At 844, the boot flow continues.

At 846, SOC 810 obtains other relevant parameters for SOC 810 (e.g., peripheral presence parameter, hinge angle parameter, etc.) that were previously determined by the boot controller. As indicated at 848, additional pre-boot content may be displayed during the boot flow before the operating system is loaded. For example, a BIOS screen, security passwords (e.g., password-protected hard drives, etc.), on-screen keyboards, and, in some scenarios, operating system log-in screens. In all of these examples, the pre-boot content is displayed in an arrangement based on the pre-boot device posture detected by boot controller 802. For example, the orientation parameter that was communicated to the boot process by boot controller 802 can be used to ensure that the additional pre-boot content is aligned with the orientation of the display device. In other embodiments, the orientation parameter can be obtained by the boot process at pre-boot posture table 808.

In at least one embodiment, pre-boot posture table 808 may be accessed by the boot process to determine whether a hardware peripheral was detected by the boot controller. This information can be used by the boot process to ensure that the additional pre-boot content is displayed in an exposed area of a display panel of the display device (or in another display panel of the display device) if the hardware peripheral was detected and is covering a portion of the display panel. Pre-boot posture table 808 may also be accessed by the boot process to determine a hinge angle of the device (e.g., for a foldable device). In one example scenario, this information can be used by the boot process to ensure that the additional pre-boot content is displayed in the display panel without crossing a bend in the display panel if, for example, a foldable device is in a journal or laptop posture.

It should be noted that the size of the keyboard and the physical relationship between the sensors and the display device may also be included in the pre-boot posture table 808, may be stored in another table or storage structure accessible to the boot process and the operating system, or may be hard coded in the BIOS (e.g., 612, 712). Once the operating system is loaded, the operating system handles the orientation of content to be displayed on the display device.

At any particular time, the system state S0 may change to G3, S3, S4, or S5 system states. If the state subsequently changes from G3 or S3 to S0, then no action is required because the system does not need to execute the boot flow again. However, if the state subsequently changes from G3, S4, or S5 system state to S0 system state, then the process shown in interaction diagrams 850A-850B is performed.

Figure 9A:
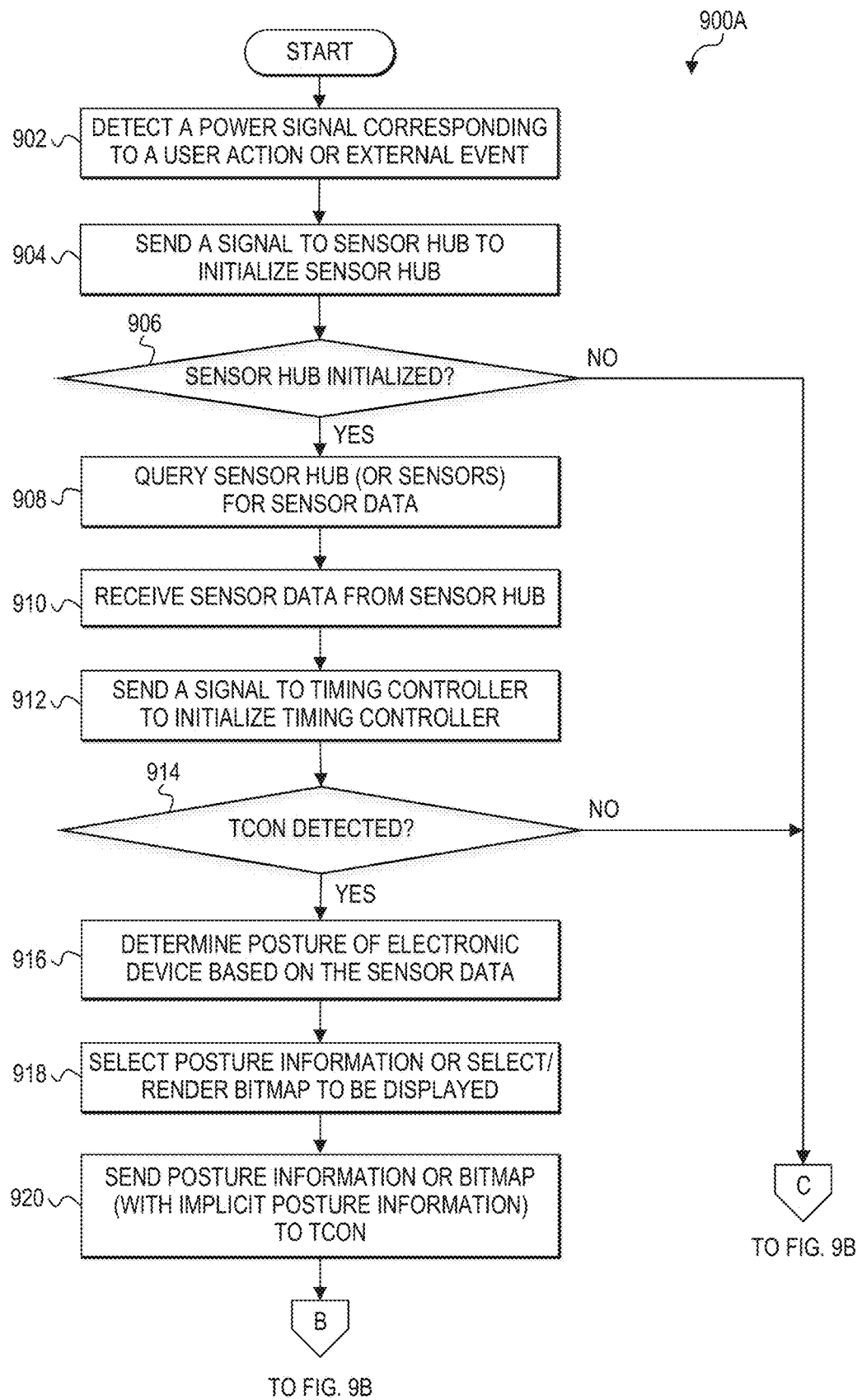
FIGS. 9A-9B are high-level flowcharts of an example process for realizing device posture-based pre-boot display orientation according to an embodiment.
Figure 9B:
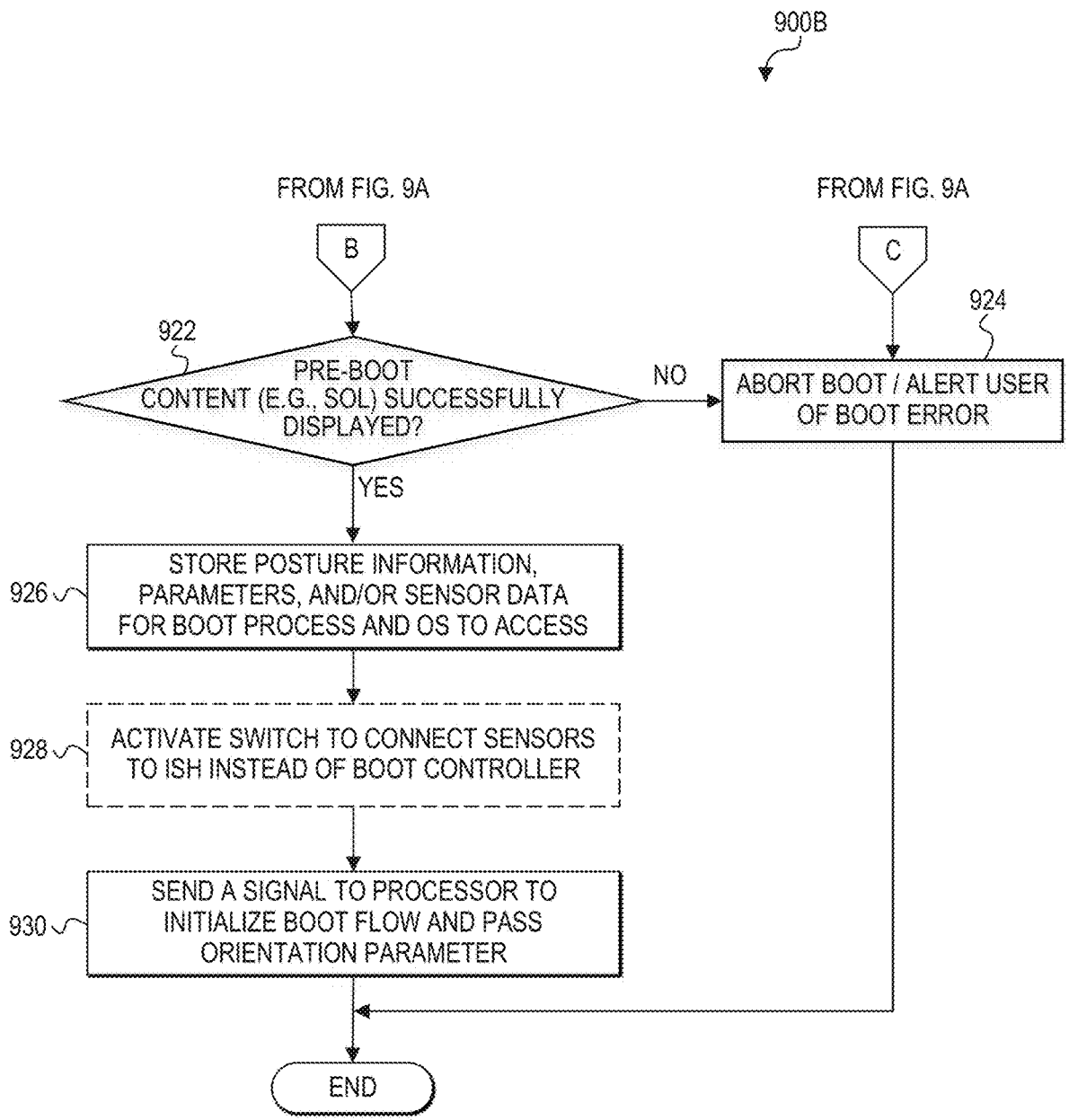

Turning to FIGS. 9A-9B, FIGS. 9A-9B show simplified flowcharts 900A-900B of example operations associated with achieving device posture-based pre-boot display orientation in accordance with embodiments herein. In at least one embodiment, one or more operations correspond to activities of FIGS. 9A-9B. A boot controller (e.g., 650, 750) of a computing device (e.g., 600, 700, 800), or a portion thereof, may perform or utilize at least some of the one or more operations.

Beginning in flowchart 900A, at 902, the boot controller detects a power signal corresponding to a user action or external event. For example, a power switch on the computing device may be turned on by a user, or an external event (e.g., restart request, fatal error during processing, etc.) may occur that requires the system to reboot. At 904, the firmware for a sensor hub (e.g., 630, 804) is loaded and a signal is sent to the sensor hub to initialize it. At 906, the boot controller may receive a signal from the sensor hub indicating whether the initialization of the sensor hub was successful. If the sensor hub initialization was not successful, then at 926 in flowchart 900B, the boot process may be aborted and an alert may be sent to the user (e.g., via a display device) that a boot error occurred.

If the sensor hub initialization was successful, then at 908, the boot controller can query the sensor hub for sensor data. Alternatively, the sensors may be directly connected to the boot controller and may be queried by the boot controller for sensor data. At 910, the boot controller receives sensor data from the sensor hub (or directly from the sensors in some implementations).

At 912, the firmware for a timing controller or TCON (e.g., 622, 722, 806) in a display device (e.g., 620, 720) is loaded and a signal is sent to the TCON to initialize it. At 914, the boot controller may receive a signal from the TCON indicating whether the initialization of the TCON was successful. If the TCON initialization was not successful, then at 926 in flowchart 900B, the boot process may be aborted and an alert may be sent to the user (e.g., via the display device) that a boot error occurred.

If the TCON initialization was successful, then at 916, the boot controller determines the posture of the computing device based on the received sensor data. The posture of the computing device may be defined by one or more parameters depending on the computing device's particular type. Thus, determining the posture can include deriving the appropriate parameters from the sensor data. For example, orientation of a display panel, the presence/absence of a keyboard attached to a display panel, and a hinge angle of a hinge that connects different portions of a computing device are three possible parameters that may be derived from sensor data and that could be used alone or in any combination to determine the posture of the computing device.

At 918, posture information may be selected based on the parameters derived from the sensor data. For example, posture information may comprise representative values that are mapped to various combinations of the parameters in a posture lookup table (e.g., 656, 756). The boot controller may search the posture lookup table based on a parameter (or combination of parameters) that was derived from the sensor data and select the corresponding posture information.

In another embodiment, a bitmap with pre-boot content (e.g., SOL image) may be selected from a bitmap lookup table. The bitmap lookup table may include a plurality of bitmaps rendered with pre-boot content to be displayed in different arrangements in a display screen of a display device. The different arrangements can include different orientations and/or placements of the bitmaps in the display screen. The bitmaps can each be mapped to the appropriate parameter or combination of parameters that defines a posture of the computing device for which the mapped bitmap would be correctly aligned for consumption by a user when displayed.

At 920, the posture information is sent to the TCON by the boot controller. In other embodiments, the selected or rendered bitmap, which includes implicit posture information, is sent to the TCON to be displayed on the display device. The bitmap includes implicit posture information because the bitmap is rendered to display the pre-boot content in an arrangement in which the pre-boot content is in alignment with the posture of the device (e.g., in an orientation and placement in the display panel that is consumable by a user).

In one embodiment, the TCON receives posture information in the form of a representative value or other similar data, and the TCON may use the posture information to select a bitmap of pre-boot content to be displayed. For example, a table that maps the posture information to the appropriate bitmap may be searched based on the posture information. In another embodiment, the TCON can receive the actual bitmap of the pre-boot content to be displayed.

Continuing in flowchart 900B, at 922, the boot controller may receive a signal from the TCON indicating whether the pre-boot content (e.g., SOL image) was successfully displayed. If the TCON did not successfully display the pre-boot content, then at 924, the boot process may be aborted and an alert may be sent to the user (e.g., via the display device) that a boot error occurred.

If the TCON successfully displayed the pre-boot content, however, then at 926, the posture information, one or more of the parameters derived from the sensor data, and/or the received sensor data can be stored in an appropriate storage or memory that will be accessible by a boot process once the boot process is initiated, and by the operating system once the operating system is successfully loaded by the boot process.

In at least one embodiment in which an integrated sensor hub (ISH) (e.g., 714) is implemented, sensors may be multiplexed between the boot controller and the ISH. Accordingly, in this implementation, at 928, prior to the handoff to the BIOS to start the boot process, the boot controller can activate a switch (e.g., 730) to cause the communication from the sensors to flow to the ISH instead of to the boot controller. In other embodiments a power plane may be modified to allow the ISH to power on before the processor, and the ISH may be queried by the boot controller for sensor data. Accordingly, a switch may not be used in this embodiment.

At 930, the boot controller can send a signal to a processor (e.g., 610, 710, 810) of the computing device to initialize the boot flow and hand off control to the BIOS (e.g., 612, 712). In addition, the boot controller may also pass some pre-boot posture information to the boot process, such as an orientation parameter. This parameter, along with any additional parameters (or other information) stored by the boot controller in the pre-boot posture table, may be used to display additional pre-boot content in an arrangement that is aligned with the device posture as determined by boot controller. It should be noted that, alternatively, the boot controller could pass some or all of the parameters to the boot process, or that all of the parameters (including the orientation parameter) could be stored in the pre-boot posture table and accessed by the boot process to determine the device posture. The signal sent at 930 may be sent in response to receiving the indication that the pre-boot content was successfully displayed.

Figure 10:
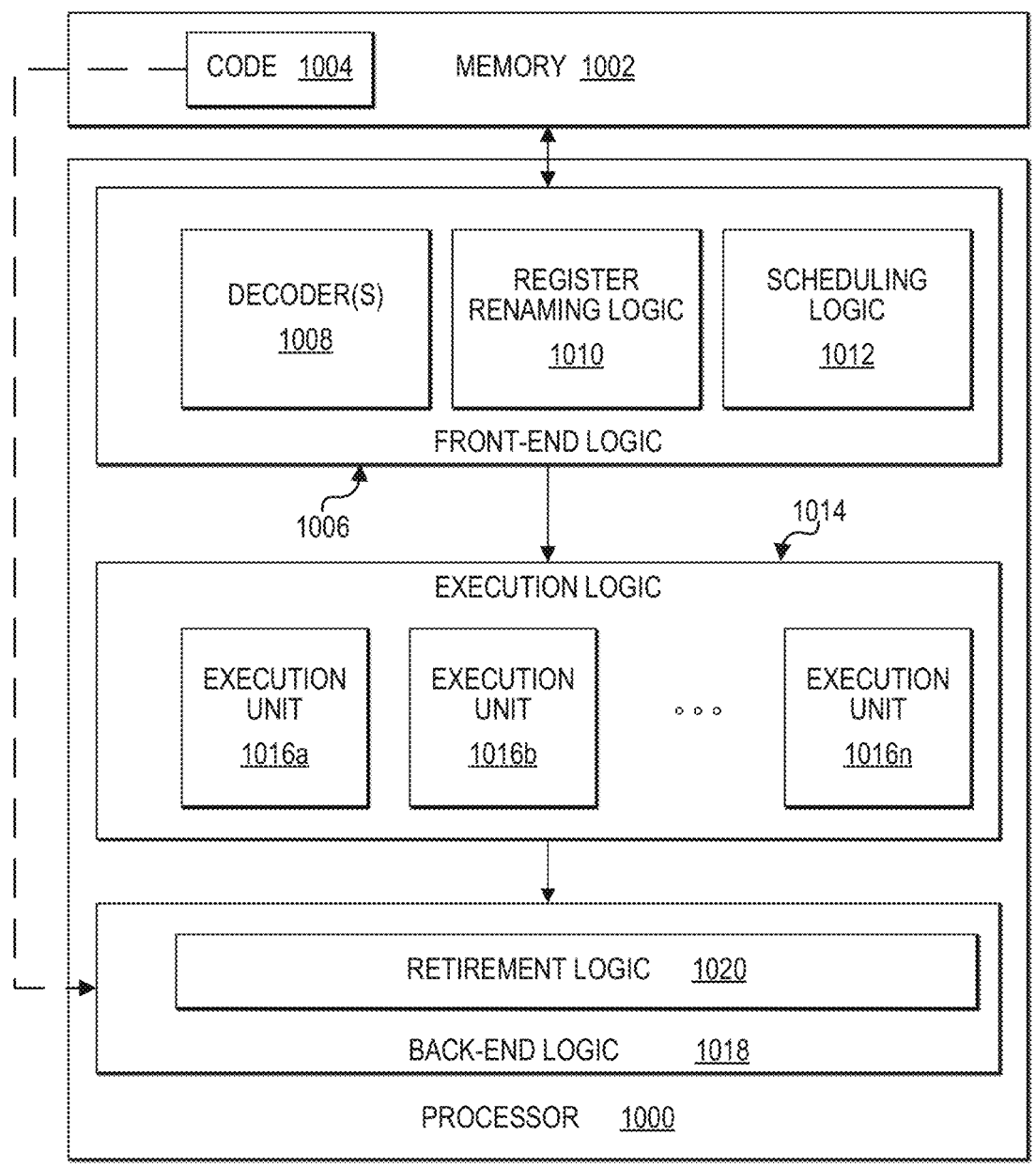
FIG. 10 is a block diagram of an example processor in accordance with one embodiment.
Figure 11:
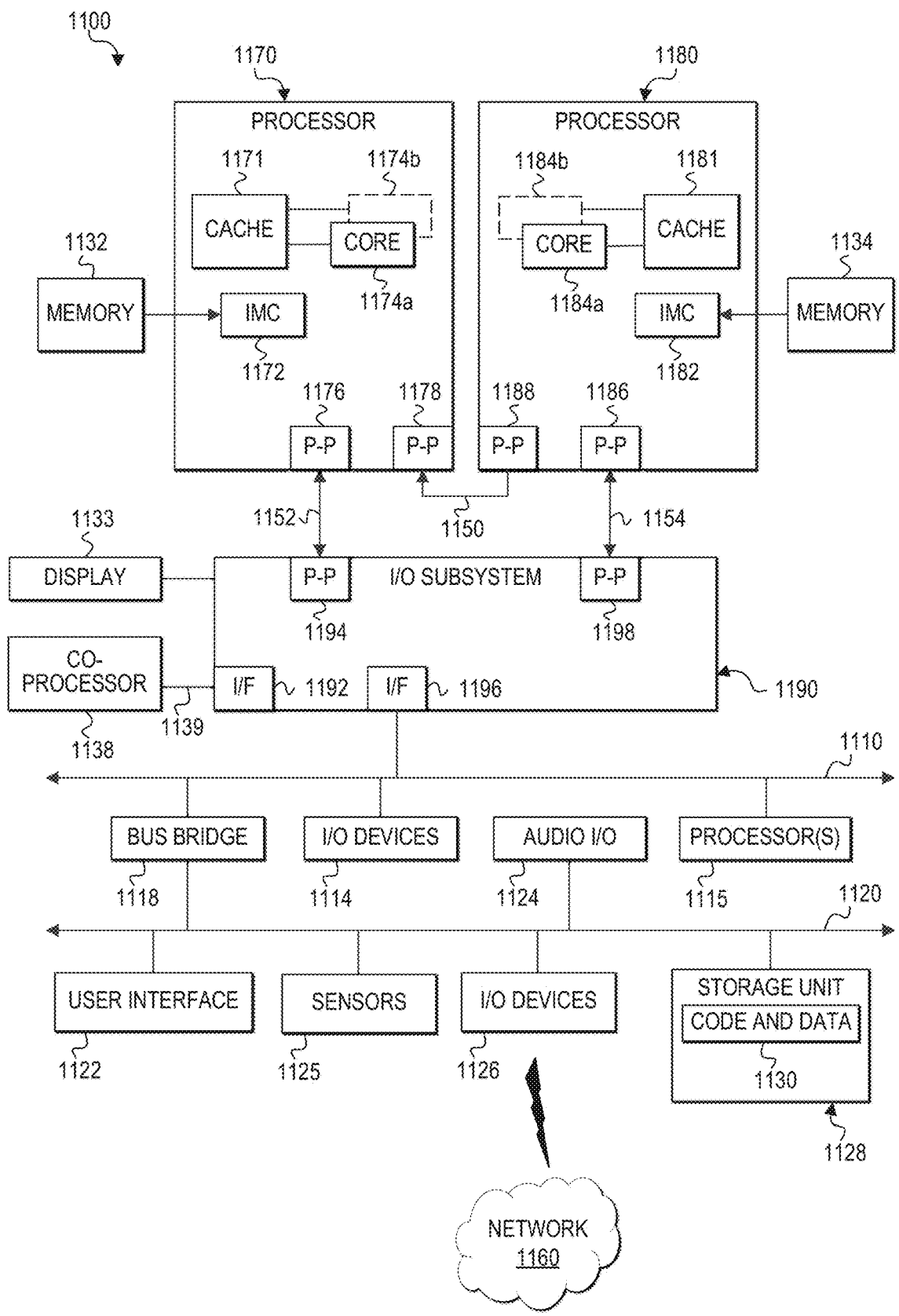
FIG. 11 is a block diagram of an example computing system in according to an embodiment.
Figure 12:
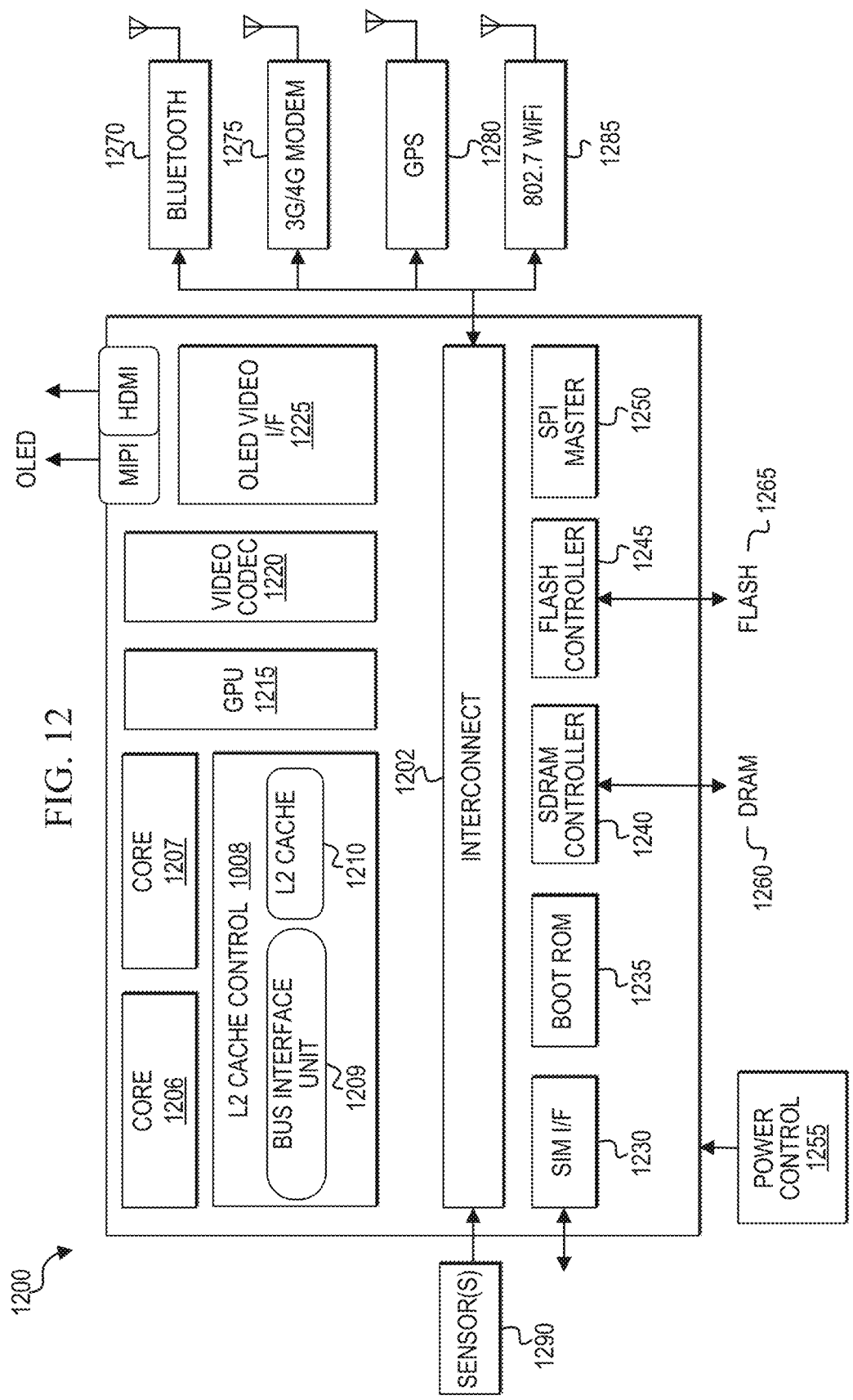
FIG. 12 is a block diagram of an example system-on-a-chip (SoC) computer architecture according to an embodiment.

FIGS. 10-12 are block diagrams of example computer architectures that may be connected to, embedded with, or otherwise interoperate with the system for realizing device posture-based pre-boot orientation and other usage support in accordance with embodiments disclosed herein. Other computer architecture designs known in the art for processors and computing systems may also be used. Generally, suitable computer architectures for embodiments disclosed herein can include, but are not limited to, configurations illustrated in FIGS. 10-12.

FIG. 10 is an example illustration of a processor according to an embodiment. Processor 1000 is an example of a type of hardware device that can be used in connection with the implementations shown and described herein (e.g., SOC 610, 710, 810 or processor circuitry 652, 752) above. Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor 1000 can also include execution logic 1014 having a set of execution units 1016a, 1016b, 1016n, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000. Such memory may be used to store a posture lookup table (e.g., 656, 756) and/or a pre-boot posture table (e.g., 658, 758) for example.

In an example implementation, processor 1000 could be used in connection with SOCs 610, 710, or 810 of computing devices 600, 700, or 800 disclosed in one or more embodiments herein. Furthermore, processor 900 could be used in connection with processor circuitry 652 or 752 of boot controllers 650, 750, or 802 disclosed in one or more embodiments herein.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the computing devices (e.g., 600, 700, 800) described herein may be configured in the same or similar manner as computing system 1100.

Processors 1170 and 1180 may be implemented as single core processors 1174a and 1184a or multi-core processors 1174a-1174b and 1184a-1184b. Processors 1170 and 1180 may each include a cache 1171 and 1181 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1100. Moreover, processors 1170 and 1180 are examples of the types of hardware that can be used in connection with the implementations shown and described herein (e.g., computing devices 600, 700, 800, laptops, dual display computing devices, foldable computing devices, tabletops, all-in-ones, tablets, phablets, etc.).

Processors 1170 and 1180 may also each include integrated memory controller logic (IMC) 1172 and 1182 to communicate with memory elements 1132 and 1134. In alternative embodiments, memory controller logic 1172 and 1182 may be discrete logic separate from processors 1170 and 1180. Memory elements 1132 and/or 1134 may store various data to be used by processors 1170 and 1180 in achieving operations and functionality outlined herein.

Processors 1170 and 1180 may be any type of processor, such as those discussed in connection with other figures. Processors 1170 and 1180 may exchange data via a point-to-point (PtP) interface 1150 using point-to-point interface circuits 1178 and 1188, respectively. Processors 1170 and 1180 may each exchange data with an I/O subsystem 1190 via individual point-to-point interfaces 1152 and 1154 using point-to-point interface circuits 1176, 1186, 1194, and 1198. I/O subsystem 1190 may include a display unit or appropriate interface for coupling to one or more display devices 1133. I/O subsystem 1190 may also exchange data with a co-processor 1138, such as a high-performance graphics circuit, machine learning accelerator, or other co-processor 1138, via an interface 1139, which could be a PtP interface circuit. In alternative embodiments, any or all of the PtP links illustrated in FIG. 11 could be implemented as a multi-drop bus rather than a PtP link.

I/O subsystem 1190 may be in communication with a bus 1110 via an interface circuit 1196. Bus 1120 may have one or more devices that communicate over it, such as a bus bridge 1118, I/O devices 1116, and potentially other processors 1115. Via a bus 1110, bus bridge 1118 may be in communication with other devices such as a user interface 1112 (such as a keyboard, mouse, touchscreen, or other input devices), one or more sensors 1125 (e.g., sensors 640, 740), I/O devices 1126 (such as modems, network interface devices, or other types of communication devices that may communicate through a computer network 1160), audio I/O devices 1114, and/or a storage unit 1128. Storage unit 1128 may store code and data 1130, which may be executed by processors 1170 and/or 1180. In alternative embodiments, any portions of the bus architectures could be implemented with one or more PtP links.

The computer system depicted in FIG. 11 is a schematic illustration of an embodiment of a computing system that may be utilized to implement various embodiments discussed herein. For example, processors 1170 and/or 1180 could be used in connection with a processor of computing devices shown and described herein (e.g., computing devices 600, 700, 800, foldable computing device, dual display device, tablet, phablet, mobile device, wearable device, etc.) and be operatively connected to appropriate sensors (e.g., 640, 740) or sensor hubs (e.g., 630, 714, 804). Furthermore, in at least one example, processors 1170 and/or 1180 could be implemented using processor 1000. It will be appreciated that various components of the system depicted in FIG. 11 may be combined in a system-on-a-chip (SoC) architecture (e.g., such as SOC 610, 710, 810) or in any other suitable configuration capable of achieving the functionality and features of examples and implementations provided herein.

Turning to FIG. 12, FIG. 12 is a simplified block diagram associated with an example ARM ecosystem SOC 1200 of the present disclosure. At least some embodiments of computing systems shown and described herein (e.g., 600, 700, 800), could be configured in the same or similar manner ARM ecosystem SOC 1200. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), dual display device, foldable computing device, Ultrabook™ system, any type of touch-enabled input device, etc.

In this example of FIG. 12, ARM ecosystem SOC 1200 may include multiple cores 1206-1207, an L2 cache control 1208, a bus interface unit 1209, an L2 cache 1210, a graphics processing unit (GPU) 1215, an interconnect 1202, a video codec 1220, and an organic light emitting diode (OLED) I/F 1225, which may be associated with mobile industry processor interface (MIPI)/high-definition multimedia interface (HDMI) links that couple to an OLED display.

ARM ecosystem SOC 1200 may also include a subscriber identity module (SIM) I/F 1230, a boot read-only memory (ROM) 1235, a synchronous dynamic random access memory (SDRAM) controller 1240, a flash controller 1245, a serial peripheral interface (SPI) master 1250, a suitable power control 1255, a dynamic RAM (DRAM) 1260, flash 1265, and one or more sensors 1290. In addition, one or more example embodiments include one or more communication capabilities, interfaces, and features such as instances of Bluetooth™ 1270, a 3G modem 1275, a global positioning system (GPS) 1280, and an 802.11 Wi-Fi 1285.

In operation, the example of FIG. 12 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

With regard to this specification generally, unless expressly stated to the contrary, use of the phrase 'at least one of' refers to any combination of the named elements, conditions, or activities. For example, 'at least one of X, Y, or Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the terms 'first', 'second', 'third', etc., are intended to distinguish the particular items (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Further, it should be appreciated that the examples presented above are nonlimiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any subject matter or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the claims herein. In some cases, the actions recited in the claims can be performed in a different order and still achieve desirable results. In addition, the processes depicted in the accompanying figures do not necessarily require the particular order shown, or sequential order, to achieve desirable results.

OTHER NOTES AND EXAMPLES

The following examples pertain to embodiments in accordance with this specification. The system, apparatus, method, and machine readable storage medium embodiments can include one or a combination of the following examples:

Example A1 provides a computing device comprising a processor to be coupled to a display device, and a boot controller coupled to the processor and to be coupled to the display device. The boot controller is configured to detect a power signal; receive sensor data detected by one or more sensors prior to an operating system being loaded by a boot process of the processor; determine a posture associated with the display device based on the sensor data detected by the one or more sensors; and communicate, to the display device, posture information indicating the posture associated with the display device. The pre-boot content is to be displayed on a display panel of the display device in a first arrangement based on the posture information.

Example A2 comprises the subject matter of Example A1, and to determine the posture is to include determining a first parameter that indicates an orientation of the display device.

Example A3 comprises the subject matter of Example A2, and the first arrangement includes the pre-boot content being aligned with the orientation of the display device.

Example A4 comprises the subject matter of any one of Examples A2-A3, and the boot controller is further to select the posture information based, at least in part, on the first parameter.

Example A5 comprises the subject matter of any one of Examples A2-A4, and the boot controller is further to select a bitmap of the pre-boot content based, at least in part, on the first parameter and to send the bitmap of the pre-boot content to the display device.

Example A6 comprises the subject matter of any one of Examples A2-A5, and the boot controller is further to in response to receiving an indication that the pre-boot content was displayed on the display panel of the display device, initialize a boot process on the processor and communicate the first parameter to the boot process.

Example A7 comprises the subject matter of Example A6, and the boot controller is further to store pre-boot posture information in a pre-boot posture table to be accessed by the boot process, and the pre-boot posture information includes a second parameter that indicates whether a hardware peripheral is present and covers a first portion of the display panel of the display device.

Example A8 comprises the subject matter of Example A7, and the first parameter and the second parameter are to be used by the boot process to render a second bitmap with second pre-boot content to be displayed in the first arrangement prior to the operating system being loaded.

Example A9 comprises the subject matter of any one of Examples A2-A8, and to determine the posture is to further include determining a second parameter that indicates whether a hardware peripheral is present and covers a first portion of the display panel of the display device.

Example A10 comprises the subject matter of Example A9, and in response to a determination that the hardware peripheral is present and covers the first portion of the display panel, the first arrangement is to further include the pre-boot content being located in a second portion of the display panel that is not covered by the hardware peripheral.

Example A11 comprises the subject matter of any one of Examples A9-A10, and to determine the posture is to further include determining a third parameter that indicates a hinge angle of a hinge on a housing member of the computing device.

Example A12 comprises the subject matter of Example A11, and the boot controller is further to select the posture information based on at least one of the first parameter, the second parameter, or the third parameter.

Example A13 comprises the subject matter of any one of Examples A1-A12, and the boot controller is further to subsequent to receiving an indication that the pre-boot content was displayed on the display panel of the display device, activate a switch to connect the one or more sensors to an integrated sensor hub instead of the boot controller.

Example A14 comprises the subject matter of any one of Examples A1-A4 or A6-A13, and the display device includes a timing controller, and the timing controller is configured to receive the posture information from the boot controller, and select, based on the posture information, a bitmap of the pre-boot content. The bitmap is one of a plurality of bitmaps, and each bitmap is rendered with the pre-boot content to be displayed in a different arrangement.

Example C1 provides one or more machine readable storage media comprising instructions that when executed by processor circuitry of a boot controller, cause the processor circuitry to: detect a power signal receive sensor data detected by one or more sensors prior to an operating system being loaded by a boot process of a system-on-a-chip (SOC) coupled to the boot controller; determine a posture associated with a display device coupled to the boot controller and the SOC based on the sensor data; and communicate, to the display device, posture information indicating the posture associated with the display device, and pre-boot content is to be displayed on a display panel of the display device in a first arrangement based on the posture information.

Example C2 comprises the subject matter of Example C1, and to determine the posture is to include determining a first parameter that indicates an orientation of the display device.

Example C3 comprises the subject matter of Example C2, and the first arrangement includes the pre-boot content being aligned with the orientation of the display device.

Example C4 comprises the subject matter of any one of Examples C2-C3, and the instructions, when executed by the processor circuitry of the boot controller, further cause the processor circuitry to select the posture information based, at least in part, on the first parameter.

Example C5 comprises the subject matter of any one of Examples C2-C4, and the instructions, when executed by the processor circuitry of the boot controller, further cause the processor circuitry to select a bitmap of the pre-boot content based, at least in part, on the first parameter and to send the bitmap of the pre-boot content to the display device.

Example C6 comprises the subject matter of any one of Examples C2-05, and the instructions, when executed by the processor circuitry of the boot controller, further cause the processor circuitry to in response to receiving an indication that the pre-boot content was displayed on the display panel of the display device, initialize a boot process on the SOC and communicate the first parameter to the boot process.

Example C7 comprises the subject matter of Example C6, and the instructions, when executed by the processor circuitry of the boot controller, further cause the processor circuitry to store pre-boot posture information in a pre-boot posture table to be accessed by the boot process, and the pre-boot posture information includes a second parameter that indicates whether a hardware peripheral is present and covers a first portion of the display panel of the display device.

Example C8 comprises the subject matter of Example C7, and the first parameter and the second parameter are to be used by the boot process to render a second bitmap with second pre-boot content to be displayed in the first arrangement prior to the operating system being loaded.

Example C9 comprises the subject matter of any one of Examples C2-C8, and to determine the posture is to further include determining a second parameter that indicates whether a hardware peripheral is present and covers a first portion of the display panel of the display device.

Example C10 comprises the subject matter of Example C9, and in response to a determination that the hardware peripheral is present and covers the first portion of the display panel, the first arrangement is to further include the pre-boot content being located in a second portion of the display panel that is not covered by the hardware peripheral.

Example C11 comprises the subject matter of any one of Examples C9-C10, and to determine the posture is to further include determining a third parameter that indicates a hinge angle of a hinge on one or more housing members containing the processor circuitry and the SOC.

Example C12 comprises the subject matter of Example C11, and the instructions, when executed by the processor circuitry of the boot controller, further cause the processor circuitry to select the posture information based on at least one of the first parameter, the second parameter, or the third parameter.

Example C13 comprises the subject matter of any one of Examples C1-C12, and the instructions, when executed by the processor circuitry of the boot controller, further cause the processor circuitry to subsequent to receiving an indication that the pre-boot content was displayed on the display panel of the display device, activate a switch to connect the one or more sensors to an integrated sensor hub instead of the boot controller.

Example M1 provides a method comprising: detecting, by a boot controller coupled to a processor, a power signal; receiving sensor data detected by one or more sensors prior to an operating system being loaded by a boot process of the processor; determining a posture associated with a display device coupled to the boot controller and the processor based on the sensor data; and communicating to the display device, posture information indicating the posture associated with the display device, and pre-boot content is displayed on a display panel of the display device in a first arrangement based on the posture information Example M2 comprises the subject matter of Example M1, and the determining the posture includes determining a first parameter that indicates an orientation of the display device.

Example M3 comprises the subject matter of Example M2, and the first arrangement includes the pre-boot content being aligned with the orientation of the display device.

Example M4 comprises the subject matter of any one of Examples M2-M3, and further comprises selecting the posture information based, at least in part, on the first parameter.

Example M5 comprises the subject matter of any one of Examples M2-M3, and further comprises selecting a bitmap of the pre-boot content based, at least in part, on the first parameter; and sending the bitmap of the pre-boot content to the display device.

Example M6 comprises the subject matter of any one of Examples M2-M5, and further comprises, in response to receiving an indication that the pre-boot content was displayed on the display panel of the display device, initializing a boot process on the processor and communicating the first parameter to the boot process.

Example M7 comprises the subject matter of Example M6, and further comprises storing pre-boot posture information in a pre-boot posture table to be accessed by the boot process, and the pre-boot posture information includes a second parameter that indicates whether a hardware peripheral is present and covers a first portion of the display panel of the display device.

Example M8 comprises the subject matter of Example M7, and the boot process uses the first parameter and the second parameter to render a second bitmap with second pre-boot content, and the method further comprises providing the second bitmap for display in the first arrangement prior to the operating system being loaded.

Example M9 comprises the subject matter of any one of Examples M2-M8, and the determining the posture further includes determining a second parameter that indicates whether a hardware peripheral is present and covers a first portion of the display panel of the display device.

Example M10 comprises the subject matter of Example M9, and in response to determining that the hardware peripheral is present and covers the first portion of the display panel, the first arrangement further includes the pre-boot content being located in a second portion of the display panel that is not covered by the hardware peripheral.

Example M11 comprises the subject matter of any one of Examples M9-M10, and the determining the posture further includes determining a third parameter that indicates a hinge angle of a hinge on one or more housing members containing the boot controller and the processor.

Example M12 comprises the subject matter of Example M11, and further comprises selecting the posture information based on at least one of the first parameter, the second parameter, or the third parameter.

Example M13 comprises the subject matter of any one of Examples M1-M12, and further comprises, subsequent to receiving an indication that the pre-boot content was displayed on the display panel of the display device, activating a switch to connect the one or more sensors to an integrated sensor hub instead of the boot controller.

Example M14 comprises the subject matter of any one of Examples M1-M4 or M6-M13, and further comprises receiving, by a timing controller in the display device, the posture information from the boot controller; and selecting, based on the posture information, a bitmap of the pre-boot content, and the bitmap is one of a plurality of bitmaps, and each bitmap is rendered with the pre-boot content to be displayed in a different arrangement.

Example P1 provides an apparatus comprising memory circuitry and processor circuitry coupled to the memory circuitry and configured to be coupled to a first processor of a computing device and to a display device of the computing device. The processor circuitry is to detect a power signal; in response to detecting the power signal, receive sensor data detected by one or more sensors prior to a boot process for the first processor being initialized; determine a posture associated with the display device based on the sensor data;

and communicate, to the display device, posture information indicating the posture associated with the display device, and pre-boot content is to be displayed on a display panel of the display device in a first arrangement based on the posture information.

Example P2 comprises the subject matter of Example P1, and to determine the posture of the display device is determine at least one of a first parameter that indicates an orientation of the display device, or a second parameter that indicates whether a peripheral is present on the display device.

Example P3 comprises the subject matter of Example P2, and the first arrangement includes the pre-boot content being aligned with the orientation of the display device.

Example P4 comprises the subject matter of any one of Examples P2-P3, and the processor circuitry is further to select the posture information based on either the first parameter or a combination of the first parameter and the second parameter.

Example P5 comprises the subject matter of any one of Examples P2-P4, and the processor circuitry is further to: select a bitmap of the pre-boot content based, at least in part, on the first parameter; and to send the bitmap of the pre-boot content to the display device.

Example P6 comprises the subject matter of any one of Examples P2-P5, and the processor circuitry is further to, in response to receiving an indication that the pre-boot content was displayed on the display panel of the display device, initialize a boot process on the first processor and communicate the first parameter to the boot process.

Example P7 comprises the subject matter of Example P6, and the processor circuitry is further to store pre-boot posture information in a pre-boot posture table to be accessed by the boot process, and the pre-boot posture information includes the second parameter.

Example P8 comprises the subject matter of any one of Examples P6-P7, and the first parameter and the second parameter are to be used by the boot process to render a second bitmap with second pre-boot content to be displayed in the first arrangement prior to an operating system being loaded by the boot process.

Example P9 comprises the subject matter of any one of Examples P2-P8, and, in response to a determination that the hardware peripheral is present and covers the first portion of the display panel, the first arrangement is to further include the pre-boot content being located in a second portion of the display panel that is not covered by the hardware peripheral.

Example P10 comprises the subject matter of any one of Examples P2-P9, and to determine the posture is to further include determining a third parameter that indicates a hinge angle of a hinge on a housing member of the apparatus.

Example P11 comprises the subject matter of Example P10, and the processor circuitry is further to select the posture information based on at least one of the first parameter, the second parameter, or the third parameter.

Example P12 comprises the subject matter of any one of Examples P1-P11, and the processor circuitry is further to, subsequent to receiving an indication that the pre-boot content was displayed on the display panel of the display device, activate a switch to connect the one or more sensors to an integrated sensor hub instead of the apparatus.

An Example Y1 provides an apparatus, the apparatus comprising means for performing the method of any one of the Examples M1-M14.

Example Y2 comprises the subject matter of Example Y1, and the means for performing the method comprises at least one processor and at least one memory element.

Example Y3 comprises the subject matter of Example Y2, and the at least one memory element comprises machine readable instructions that when executed, cause the apparatus to perform the method of any one of Examples M1-M14.

Example Y4 comprises the subject matter of any one of Examples Y1-Y3, and the apparatus is one of a computing system or a system-on-a-chip.

An Example X1 provides at least one machine readable storage medium comprising instructions, where the instructions when executed realize a computing device as in any one of Examples A1-A14, implement a method as in any one of Examples M1-M14, or realize an apparatus as in any one of Examples P1-P12.

An Example Z1 provides a system that comprises the apparatus of any one of Examples P1-P12.

What is claimed is:

1. A computing device comprising:
 a processor to be coupled to a display device; and
 a boot controller coupled to the processor and to be coupled to the display device, wherein the boot controller is to:
   receive sensor data, wherein the sensor data is to be detected by one or more sensors subsequent to an event to power on the computing device and prior to an operating system being loaded by a boot process of the processor;
   use the sensor data to determine posture information indicating a posture associated with the display device; and
   communicate, to the display device, the posture information indicating the posture associated with the display device, wherein pre-boot content is to be displayed on a display panel of the display device in a first arrangement based on the posture information.

2. The computing device of claim 1, wherein the boot controller is further to:
 determine a first parameter that indicates an orientation of the display device.

3. The computing device of claim 2, wherein the first arrangement includes the pre-boot content being aligned with the orientation of the display device.

4. The computing device of claim 2, wherein the posture information is to be determined based, at least in part, on the first parameter.

5. The computing device of claim 2, wherein the boot controller is further to:
 select a bitmap of the pre-boot content based, at least in part, on the first parameter; and
 send the bitmap of the pre-boot content to the display device.

6. The computing device of claim 2, wherein the boot controller is further to:
 in response to receiving an indication that the pre-boot content was displayed on the display panel of the display device, initialize a boot process on the processor and communicate the first parameter to the boot process.

7. The computing device of claim 6, wherein the boot controller is further to:
 store pre-boot posture information in a pre-boot posture table to be accessed by the boot process, wherein the pre-boot posture information includes a second parameter that indicates whether a hardware peripheral is present and covers a first portion of the display panel of the display device.

8. The computing device of claim 7, wherein the first parameter and the second parameter are to be used by the boot process to render a second bitmap with second pre-boot content to be displayed in the first arrangement prior to the operating system being loaded.

9. The computing device of claim 2, wherein the boot controller is further to:
determine a second parameter that indicates whether a hardware peripheral is present and covers a first portion of the display panel of the display device.

10. The computing device of claim 9, wherein, in response to a determination that the hardware peripheral is present and covers the first portion of the display panel, the first arrangement is to further include the pre-boot content being located in a second portion of the display panel that is not covered by the hardware peripheral.

11. The computing device of claim 9, wherein the boot controller is further to:
determine a third parameter that indicates a hinge angle of a hinge on a housing member of the computing device.

12. The computing device of claim 11, wherein the posture information is to be determined based on at least one of the first parameter, the second parameter, or the third parameter.

13. The computing device of claim 2, wherein to determine the posture information is to include using at least the first parameter to select the posture information from a posture lookup table.

14. The computing device of claim 1, wherein the boot controller is further to:
subsequent to receiving an indication that the pre-boot content was displayed on the display panel of the display device, activate a switch to connect the one or more sensors to an integrated sensor hub instead of the boot controller.

15. The computing device of claim 1, wherein the display device includes a timing controller, the timing controller configured to:
receive the posture information from the boot controller; and
select, based on the posture information, a bitmap of the pre-boot content, wherein the bitmap is one of a plurality of bitmaps, wherein each bitmap is rendered with the pre-boot content to be displayed in a different arrangement.

16. One or more machine readable storage media comprising instructions for execution that when executed by processor circuitry of a boot controller, cause the processor circuitry to:
receive sensor data detected by one or more sensors subsequent to an event to power on a system-on-a-chip (SOC) coupled to the boot controller and prior to an operating system being loaded by a boot process of the SOC;
determine posture information based on the sensor data, wherein the posture information indicates a posture associated with a display device coupled to the boot controller and the SOC; and
communicate, to the display device, the posture information indicating the posture associated with the display device, wherein pre-boot content is to be displayed on a display panel of the display device in a first arrangement based on the posture information.

17. The one or more machine readable storage media of claim 16, wherein the instructions for execution, when executed by the processor circuitry of the boot controller, further cause the processor circuitry to determine a first parameter that indicates an orientation of the display device, and wherein the first arrangement includes the pre-boot content being aligned with the orientation of the display device.

18. The one or more machine readable storage media of claim 17, wherein the instructions for execution, when executed by the processor circuitry of the boot controller, further cause the processor circuitry to:
in response to receiving an indication that the pre-boot content was displayed on the display panel of the display device, initialize a boot process on the SOC and communicate the first parameter to the boot process.

19. The one or more machine readable storage media of claim 16, wherein the instructions for execution, when executed by the processor circuitry of the boot controller, further cause the processor circuitry to:
subsequent to receiving an indication that the pre-boot content was displayed on the display panel of the display device, activate a switch to connect the one or more sensors to an integrated sensor hub instead of the boot controller.

20. A method comprising:
receiving, by a boot controller coupled to a processor of a computing device, sensor data detected by one or more sensors subsequent to an event to activate, reboot, or restart the computing device and prior to an operating system being loaded by a boot process of the processor;
determining, based on the sensor data, posture information indicating a posture associated with a display device coupled to the boot controller and the processor; and
communicating to the display device, the posture information indicating the posture associated with the display device, wherein pre-boot content is displayed on a display panel of the display device in a first arrangement based on the posture information.

21. The method of claim 20, further comprising determining a first parameter that indicates an orientation of the display device, wherein the first arrangement includes the pre-boot content being aligned with the orientation of the display device.

22. An apparatus comprising:
memory circuitry; and
processor circuitry coupled to the memory circuitry and configured to be coupled to a first processor of a computing device and to a display device of the computing device, wherein the processor circuitry is to:
receive sensor data detected by one or more sensors prior to a boot process for the first processor being initialized;
determine, based on sensor data, posture information indicating a posture associated with the display device, wherein the posture information is based at least on a first parameter that indicates an orientation of the display device and on a second parameter that indicates whether a hardware peripheral is present and covers a first portion of a display panel of the display device; and
communicate, to the display device, the posture information indicating the posture associated with the display device, wherein pre-boot content is to be displayed on a display panel of the display device in an arrangement based on the posture information.

23. The apparatus of claim 22, wherein the processor circuitry is further to:
in response to receiving an indication that the pre-boot content was displayed on the display panel of the display device, initialize a boot process on the first processor and communicate the first parameter to the boot process.

24. The apparatus of claim 23, wherein the first parameter and the second parameter are to be used by the boot process to render a bitmap with pre-boot content to be displayed in the arrangement prior to an operating system being loaded by the boot process.

25. The apparatus of claim 22, wherein the arrangement includes the pre-boot content being aligned with the orientation of the display device.

* * * * *